(12) United States Patent
Takaragi et al.

(10) Patent No.: US 8,045,194 B2
(45) Date of Patent: Oct. 25, 2011

(54) DOCUMENT MANAGEMENT SYSTEM, DOCUMENT MANAGEMENT APPARATUS, DOCUMENT MANAGEMENT METHOD, AND PROGRAM

(75) Inventors: Yoichi Takaragi, Yokohama (JP);
Tsutomu Murayama, Yokohama (JP);
Kunio Yoshihara, Hachioji (JP);
Shinichi Fukada, Kawasaki (JP);
Hiroyuki Kimura, Kawasaki (JP);
Tatsuo Shinagawa, Yokonama (JP)

(73) Assignee: Canon Kabushiki Kaisha (JP)

( * ) Notice: Subject to any disclaimer, the term of this patent is extended or adjusted under 35 U.S.C. 154(b) by 978 days.

(21) Appl. No.: 11/958,786

(22) Filed: Dec. 18, 2007

(65) Prior Publication Data

US 2008/0158592 A1    Jul. 3, 2008

(30) Foreign Application Priority Data

Dec. 21, 2006   (JP) .................... 2006-344756

(51) Int. Cl.
*G06K 15/00* (2006.01)
*G06K 15/02* (2006.01)
*G06F 3/12* (2006.01)
*H04N 1/00* (2006.01)
*H04N 1/21* (2006.01)

(52) U.S. Cl. ............ 358/1.14; 358/1.15; 358/1.16; 358/403; 358/462; 709/219; 382/305; 382/306

(58) Field of Classification Search ............. 358/1.14, 358/1.15, 1.16, 403, 462; 709/219; 382/305, 382/306
See application file for complete search history.

(56) References Cited

U.S. PATENT DOCUMENTS

| | | | | |
|---|---|---|---|---|
| 6,072,599 A * | 6/2000 | Oba et al. | | 358/444 |
| 6,985,243 B1 * | 1/2006 | Matsueda | | 358/1.15 |
| 7,113,297 B1 * | 9/2006 | Yamaguchi et al. | | 358/1.15 |
| 7,843,590 B2 * | 11/2010 | Ikeda et al. | | 358/1.15 |
| 2001/0029513 A1 * | 10/2001 | Kuwano et al. | | 707/522 |
| 2002/0031281 A1 * | 3/2002 | Chiba et al. | | 382/305 |
| 2002/0136564 A1 * | 9/2002 | Takamine et al. | | 399/82 |
| 2002/0171867 A1 * | 11/2002 | Nobuhara et al. | | 358/1.15 |
| 2005/0168766 A1 * | 8/2005 | Troyansky et al. | | 358/1.14 |
| 2005/0286944 A1 * | 12/2005 | Kanamoto et al. | | 399/365 |
| 2006/0056660 A1 * | 3/2006 | Tojo | | 382/112 |
| 2006/0279762 A1 * | 12/2006 | Onishi | | 358/1.14 |
| 2006/0285147 A1 * | 12/2006 | Wolfman et al. | | 358/1.14 |
| 2007/0177219 A1 * | 8/2007 | Shinozaki et al. | | 358/304 |
| 2008/0005176 A1 * | 1/2008 | Shimizu | | 707/104.1 |
| 2008/0148137 A1 * | 6/2008 | Terao et al. | | 715/200 |
| 2009/0240740 A1 * | 9/2009 | Ohsawa | | 707/200 |

FOREIGN PATENT DOCUMENTS

| | | | |
|---|---|---|---|
| JP | 2003-034436 A | | 2/2003 |
| JP | 2006093921 | * | 4/2006 |
| JP | 2006-270327 | * | 10/2006 |
| JP | 2007-088795 | * | 4/2007 |

* cited by examiner

*Primary Examiner* — Chan S Park
*Assistant Examiner* — Beniyam Menberu
(74) *Attorney, Agent, or Firm* — Rossi, Kimms & McDowell LLP

(57) ABSTRACT

A document management system capable of reliably implementing disposal management of printed matter resulting from print output based on document data. A print history of images based on the document data printed by a printing device is managed. A deletion instruction for at least one set of document data stored in a document storage device is received. The document data targeted for deletion from the document storage device based on the deletion instruction is deleted. Management information of the document data targeted for deletion from the document storage device based on the print history managed by the management unit is deleted.

11 Claims, 20 Drawing Sheets

FIG. 10

DOCUMENT HISTORY MANAGEMENT TABLE 1000

| ORIGINAL DATA ID 1001 | DOCUMENT DATA FILE NAME 1002 | DATA REGISTRATION DATE 1003 | STORAGE PERIOD 1004 | DOCUMENT DATA DELETION DATE 1005 | NUMBER OF REMAINING PRINTED PAGES 1006 | MANUSCRIPT DISPOSAL DATE 1007 |
|---|---|---|---|---|---|---|
| 00339 | 00339_REGULAR REPORT 20060619.doc | 2001/1/1 | 5 year | 2006/1/1 | 0 | 2004/2/28 |
| 12356 | 12356_REGULAR REPORT 20060626.doc | 2001/1/1 | 7 year | | 1 | |
| ....... | | | | | | |

FIG. 11

PRINT HISTORY MANAGEMENT TABLE 1100

| ORIGINAL DATA ID 1001 | PRINT DATA ID 1101 | RESOLUTION 1102 | LAYOUT 1103 | COLOR SETTING 1104 | PRINT DATE 1105 | DISPOSAL DATE 1106 |
|---|---|---|---|---|---|---|
| 00339 | 00058 | 150 | ONE-SIDED 2 IN 1 | FULL COLOR | | |
| ... | | | | | | |
| 00339 | 01235 | 300 | ONE-SIDED 1 IN 1 | MONOCHROME | | |
| 12356 | 00223 | 600 | DOUBLE SIDED 2 IN 1 | MONOCHROME | | |

FIG. 12

PRINT COMPARISON
DATA MANAGEMENT TABLE     1200

| ORIGINAL DATA ID (1001) | PRINT DATA ID (1101) | PRINT COMPARISON DATA FILE NAME (1201) | PRINT COMPARISON DATA DELETION DATE (1202) |
|---|---|---|---|
| 00339 | 00058 | 00339-00058 | 2001/1/1 |
| ⋮ | | | |
| 00339 | 01235 | 00339-01235 | |
| 12356 | 00223 | 12356-00223 | |

DOCUMENT MANAGEMENT SYSTEM, DOCUMENT MANAGEMENT APPARATUS, DOCUMENT MANAGEMENT METHOD, AND PROGRAM

BACKGROUND OF THE INVENTION

1. Field of the Invention

The present invention relates to a document management system, document management apparatus, document management method, and program for managing data of documents or the like.

2. Description of the Related Art

In recent years, the introduction of stricter regulations has meant that industry is being required to keep an ever wider variety of data for regulatory storage periods.

It is therefore necessary to be able to dispose of the data and printed material once the storage period has passed and to prove that the data has been disposed of.

In the prior art, a system has been disclosed which proceeds alternately processing for the disposal procedure capable of carrying out through disposing goods expiring its previously set disposing deadline or authorized to dispose before expiring the deadline (see Japanese Laid-Open Patent Publication (Kokai) No. 2003-034436).

However, in Japanese Patent Laid-Open No. 2003-034436, when all document data and data associated to the document data are disposed of in the document data disposal processing after the storage period has passed, the following problem occurs.

In short, links between printed matter resulting from print output of the document data and the document data are lost when the document data and data associated to the document data are disposed of. Therefore, when subsequently attempting to dispose of all the printed matter resulting from print output of the document data, disposal confirmation/registration operations are impossible and complete disposal cannot be proved.

SUMMARY OF THE INVENTION

The present invention provides a document management system, a document management apparatus, a document management method and a program capable of reliably implementing disposal management of printed matter resulting from print output based on document data.

According to a first aspect of the present invention, there is provided a document management system including a document storage device that stores document data and management information of the document data, and a printing device that prints onto paper images based on the document data stored in the document storage device, the document management system comprising a management unit adapted to manage a print history of images based on the document data printed by the printing device, a receiving unit adapted to receive a deletion instruction for at least one set of document data stored in the document storage device, a first deletion unit adapted to delete the document data targeted for deletion from the document storage device based on the deletion instruction, and a second deletion unit adapted to delete management information of the document data targeted for deletion from the document storage device based on the print history managed by the management unit.

With the arrangement of the present invention, disposal management of printed matter resulting from print output based on document data can be reliably implemented.

According to a second aspect of the present invention, there is provided a document management method for a document management system that includes a document storage device that stores document data and management information of the document data, and a printing device that prints onto paper images based on the document data stored in the document storage device, the document management method comprising a management step of managing a print history of images printed by the printing device based on the document data, a receiving step of receiving a deletion instruction for at least one set of document data stored in the document storage device, a first deletion step of deleting, based on the deletion instruction, document data targeted for deletion in the document storage device, and a second deletion step of deleting the management information of the document data targeted for deletion from the document storage device based on the print history managed in the management step.

According to a third aspect of the present invention, there is provided a document management apparatus connecting to an external printing device, comprising a document storage unit adapted to store document data and management information of the document data, a management unit adapted to manage a print history of images based on the document data printed by the external printing device, a receiving unit adapted to receive a deletion instruction for at least one set of document data stored in the document storage unit, a first deletion unit adapted to delete the document data targeted for deletion from the document storage unit based on the deletion instruction, and a second deletion unit adapted to delete management information of the document data targeted for deletion from the document storage unit based on the print history managed by the management unit.

According to a fourth aspect of the present invention, there is provided a document management method using a document management device that connects to an external printing device and includes a document storage unit adapted to store document data and management information of the document data, the document management method comprising a management step of managing a print history of images based on the document data printed by the external printing device, a receiving step of receiving a deletion instruction for at least one set of document data stored in the document storage unit, a first deletion step of deleting the document data targeted for deletion from the document storage unit based on the deletion instruction, and a second deletion step of deleting the management information of the document data targeted for deletion from the document storage unit based on the print history managed in the management step.

According to a fifth aspect of the present invention, there is provided a program for causing a document management device, which connects to an external printing device and includes a document storage unit for storing document data and management information of the document data, to execute a document management method, the document management method comprising a management step of managing a print history of images based on the document data printed by the external printing device, a receiving step of receiving a deletion instruction for at least one set of document data stored in the document storage unit, a first deletion step of deleting the document data targeted for deletion from the document storage unit based on the deletion instruction, and a second deletion step of deleting the management information of the document data targeted for deletion from the document storage unit based on the print history managed in the management step.

BRIEF DESCRIPTION OF THE DRAWINGS

FIG. 10 is a view of a document file history management table appearing in FIG. 6.

FIG. 11 is a view of a print history management table appearing in FIG. 6.

FIG. 12 is a view of a print comparison data management table appearing in FIG. 8.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Document Management System

Figure 1:
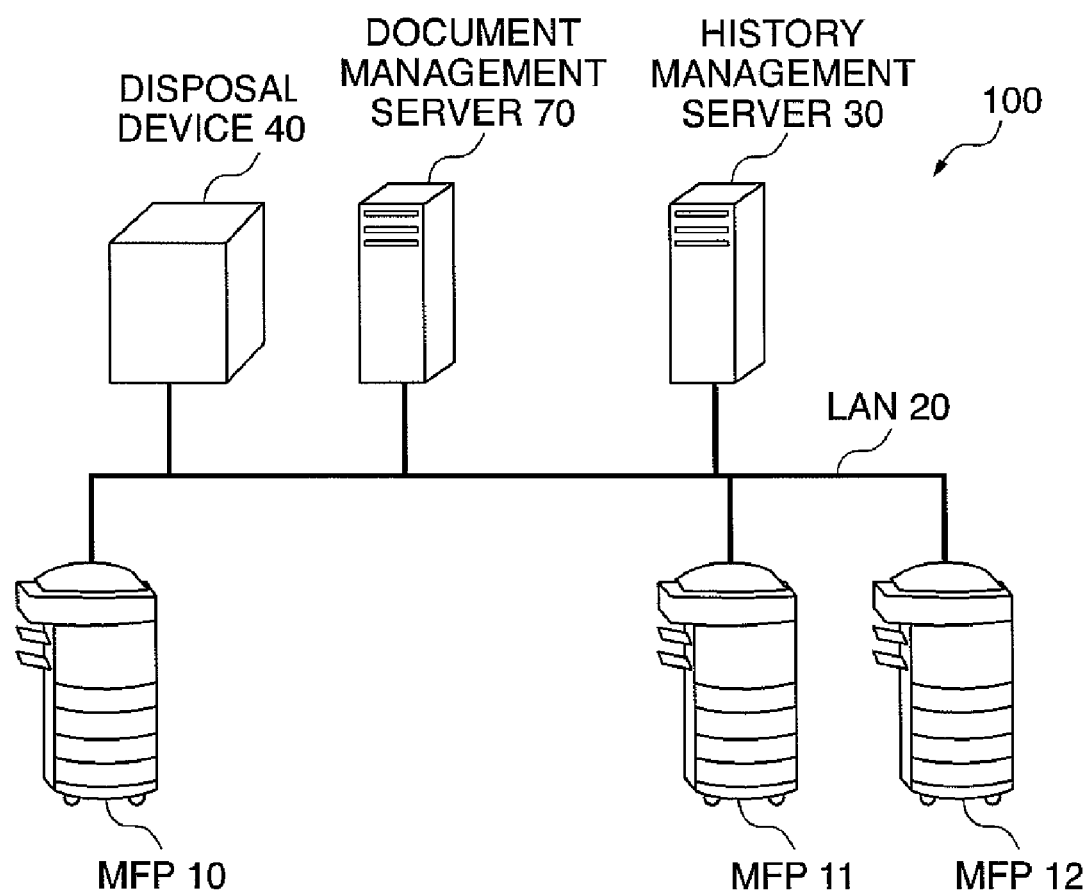
FIG. 1 is a diagram schematically showing a configuration of a network document management system according to an embodiment of the present invention.

FIG. 1 is a diagram schematically showing a configuration of a network document management system according to an embodiment of the present invention. A network document management system 100 appearing in FIG. 1 includes copiers (MFPs) 10, 11 and 12 which are network-supporting copiers, a printed paper (printed matter) disposal device 40, a document management server 70, and a LAN 20 which connects these devices to one another.

The copiers 10, 11 and 12 scan manuscripts, produce document data and either execute print processing or storage processing on the document data.

When document data is produced, copied and transferred by the copiers 10, 11, and 12, attribute information such as a file name and a creation date of the document data, and address information specifying the copiers 10, 11 and 12 is transmitted to a history management server 30 and stored therein.

When the document data is created, copied and transferred by the copiers 10, 11 and 12, the history management server 30 receives and saves the above-described attribute information including the file name and creation date of the document data, and the address information specifying the copiers 10, 11, and 12.

The disposal device 40 reads management information from the printed paper, inquires the document management server 70 about disposal processing, and, if permission is received from the document management server 70, performs disposal processing on the printed paper.

The document management server 70 is a server device which stores shared data of the copiers 10, 11, and 12.

Copier

Figure 2:
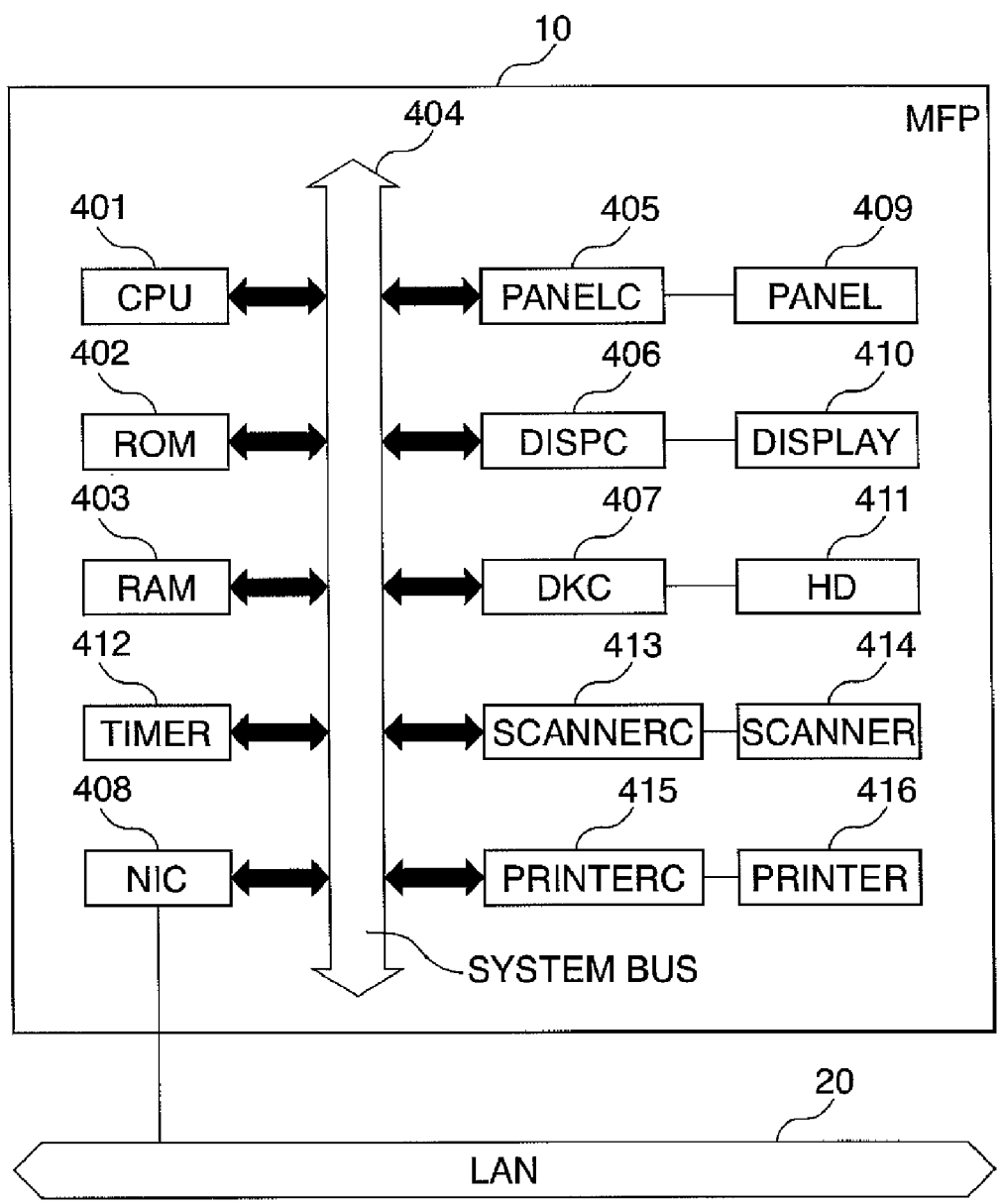
FIG. 2 is a block diagram showing an internal hardware configuration of a copier appearing in FIG. 1.

FIG. 2 is a block diagram showing an internal hardware configuration of the copier 10 appearing in FIG. 1. Since the copier 11 and the copier 12 have internal configurations which are similar to that of the copier 10, descriptions of the internal configurations of the copier 11 and copier 12 are omitted.

As shown in FIG. 2, the copier 10 includes a CPU 401 for executing software stored in a ROM 402 or a large-scale storage device (hereinafter simply referred to as an HD) 411 such as a hard disk, and performs overall control of devices connected to a system bus 404. A RAM 403 functions as a main memory, a work area, or the like for the CPU 401. A timer 412 performs count processing to keep track of a current time in the copier 10.

An external input controller (PANELC) 405 controls instruction input from an input device (hereinafter simply referred to as a touch panel) 409 which is made up of various buttons or a touch panel provided on the copier 10. A display controller (DISPC) 406 controls display by a display module (DISPLAY) 410 which is configured with a liquid crystal display or the like. A disk controller (DKC) 407 controls processing for reading data from and writing data to the HD 411. A network interface card (NIC) 408 performs bidirectional data exchange with other network devices or the file server or the like via the LAN 20.

A scanner 414 includes a light source, lenses and a solid-state imaging device which are not shown in the drawing. The scanner 414 illuminates a manuscript image using the light source, forms a reflected image of the manuscript on the solid-state imaging device and obtains a raster-form image read signal from the solid-state imaging device as image information. A scanner controller (Scanner C) 413 controls the read processing by the scanner 414. A printer controller (Printer C) 415 controls print processing of a printer 416 for printing the image information read by the scanner 414 or image information transmitted by an external party via the LAN 20.

Figure 5:
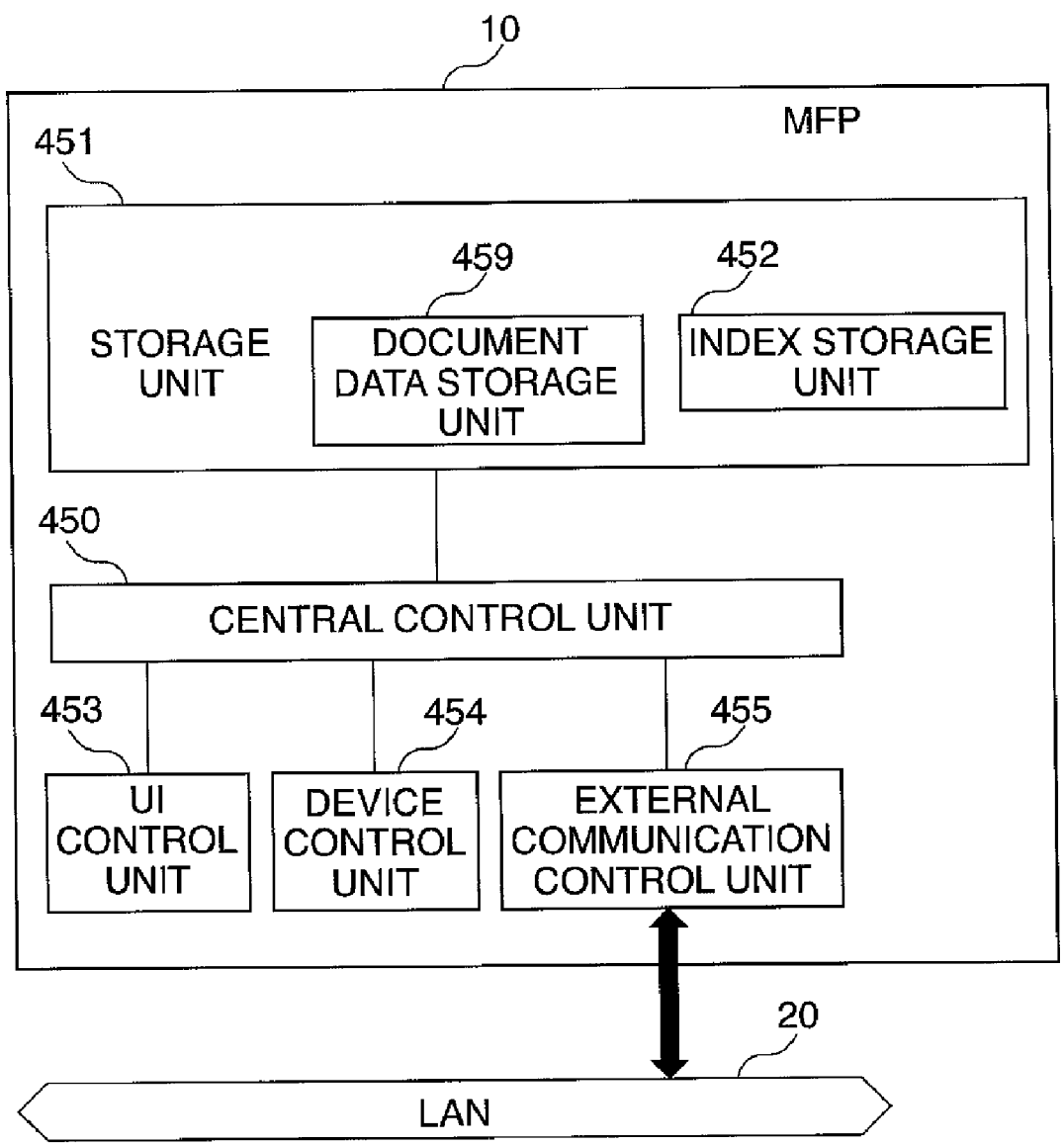
FIG. 5 is a block diagram showing a system configuration of the copier.

FIG. 5 is a block diagram showing a system configuration of the copier (MFP) 10. Since the copier 11 and the copier 12 are similar to the copier 10, descriptions of the copier 11 and the copier 12 are omitted.

The copier 10 appearing in FIG. 5 includes a central control unit 450 connected to a storage unit 451, a UI control unit 453, a device control unit 454, and an external communication control unit 455.

The storage unit 451 is configured with the HD 411 (see FIG. 2) and includes a document data storage unit 459 and an index storage unit 452. The document data storage unit 459 stores document data resulting from read processing on the paper manuscripts. The index storage unit 452 links characteristic information for specifying the paper manuscript extracted by the read processing and attribute information, such as the file name and the creation date, with document data stored in the document data storage unit 459, and stores the characteristic information and the attribute information.

The UI control unit 453 is configured with the external input controller 405 for controlling instruction input from the touch panel 409 and the display controller 406 for controlling display by the display module 410, which is a liquid crystal display or the like.

The device control unit 454 is configured with the scanner controller 413 which controls read processing by the scanner 414 and the printer controller 415 which controls print processing by the printer 416.

The external communication control unit 455 is configured with the network interface card (NIC) 408 which controls the bidirectional exchange of data with the other network devices via the LAN 20.

The copier 10 of the above-described configuration is a Multi Function Peripheral (MFP) which provides a plurality of functions including copying, printing, scanning and image transmission.

History Management Server

Figure 3:
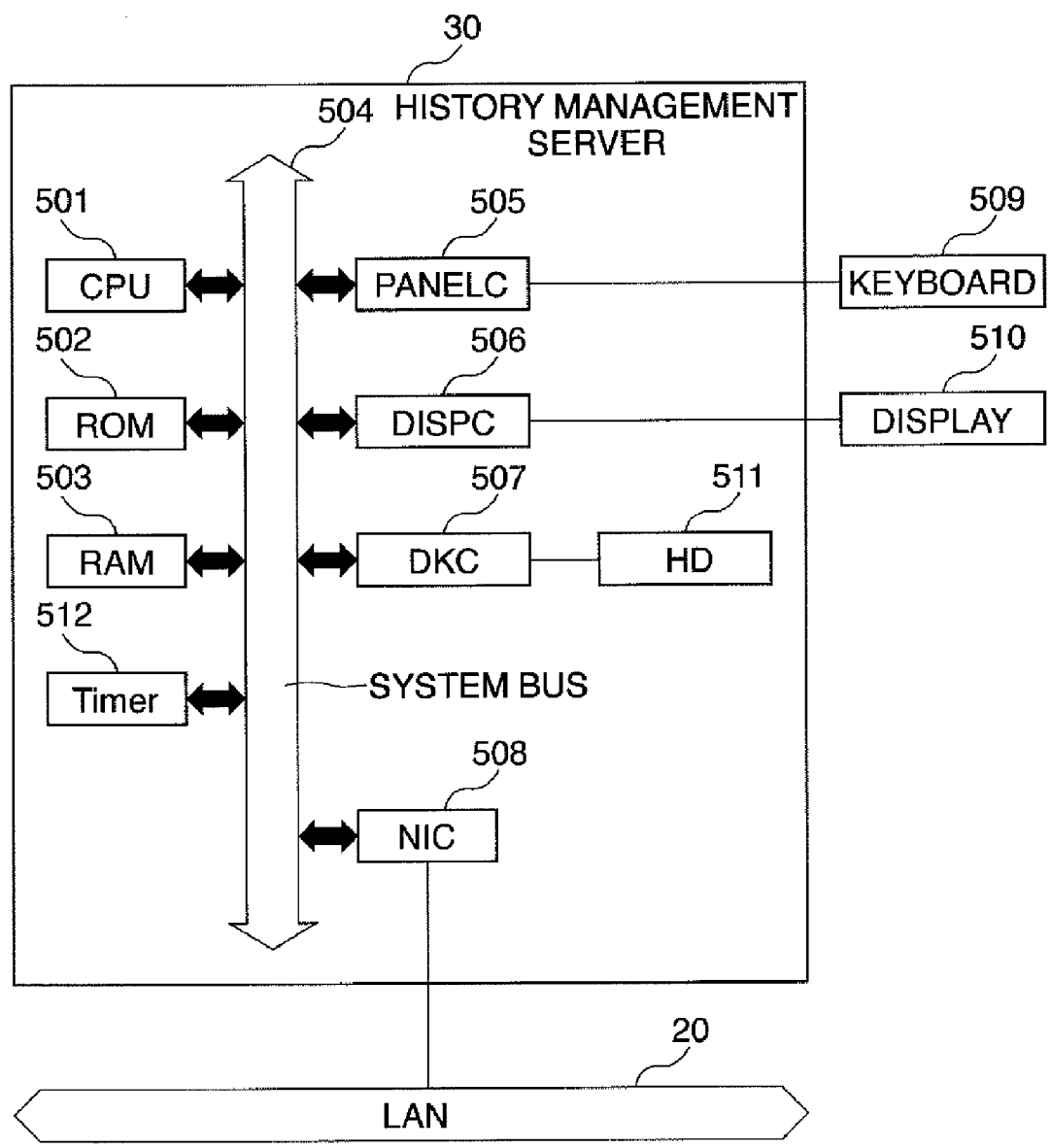
FIG. 3 is a block diagram showing an internal hardware configuration of a history management server appearing in FIG. 1.

FIG. 3 is a block diagram showing an internal hardware configuration of the history management server 30 appearing in FIG. 1.

As shown in FIG. 3, the history management server 30 includes a CPU 501 for executing software stored in a ROM 502 or a large-scale storage device (hereinafter simply referred to as an HD) 511 such as a hard disk, and performs overall control of devices connecting to a system bus 504. A RAM 503 functions as a main memory, a work area, and the like for the CPU 501. A timer 512 performs count processing to keep track of a current time in the history management server 30.

An external input controller (PANELC) 505 controls instruction input from an externally connected input interface unit (hereinafter simply referred to as a keyboard) 509 which is a keyboard or the like. A display controller (DISPC) 506 controls display of an externally connected display module (DISPLAY) 510 such as a liquid crystal display.

A disk controller (DKC) 507 controls processing for reading data from and writing data to the HD 511. A network interface card (NIC) 508 performs bidirectional data exchange with other network devices or the file server or the like via the LAN 20. The history management server 30 of the above configuration can be realized using a personal computer or workstation.

Figure 6:
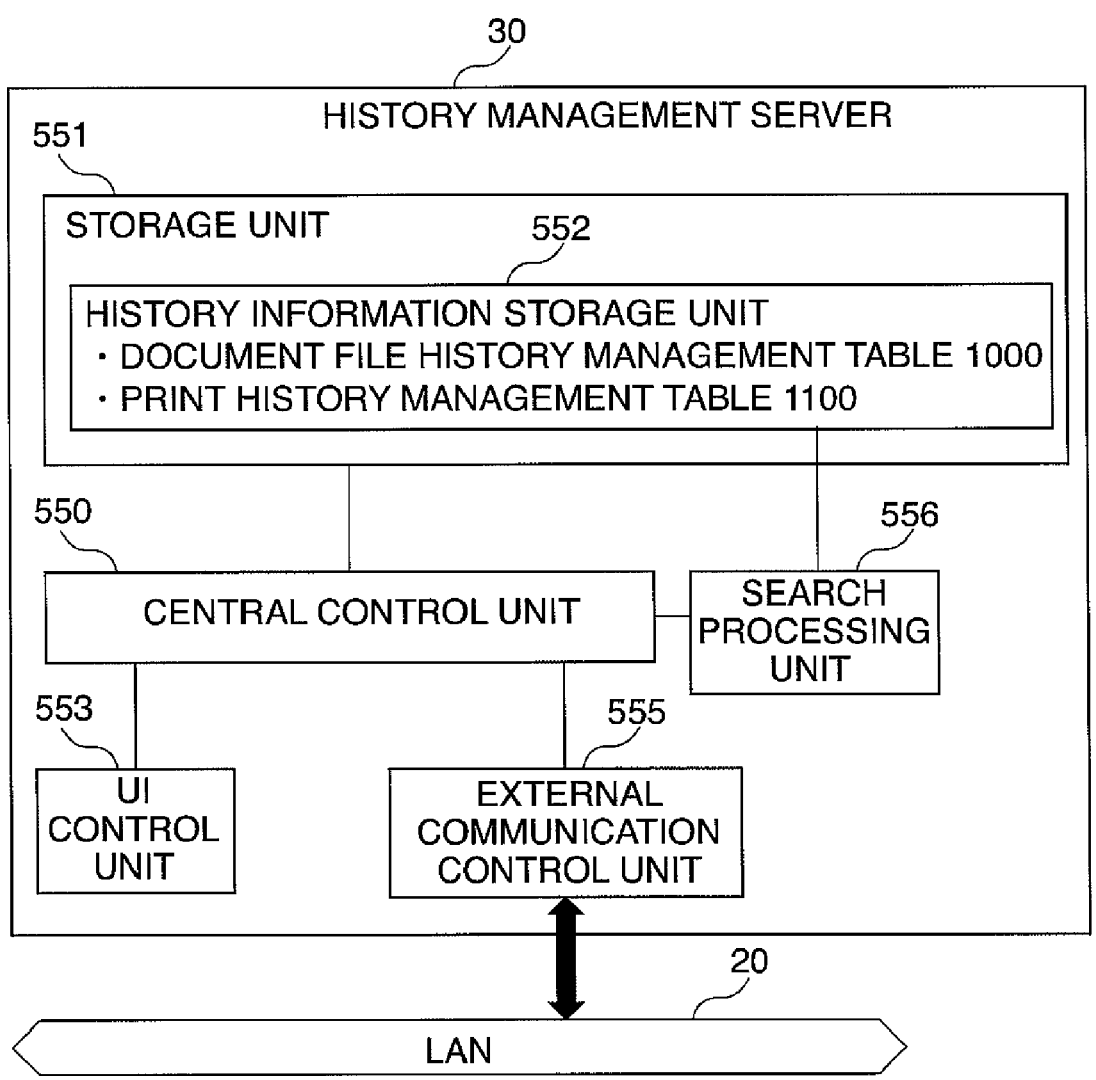
FIG. 6 is a block diagram showing a system configuration of the history management server.

FIG. 6 is a block diagram showing a system configuration of the history management server 30.

The history management server 30 appearing in FIG. 6 includes a central control unit 550 connected to a storage unit 551, a UI control unit 553, an external communication control unit 555, and a search processing unit 556.

The storage unit 551 is configured with the HD 511 (see FIG. 3), and includes a history information storage unit 552 for storing document data address information and attribute information transmitted by networked devices such as the copier 10 when storing the document data.

The search processing unit 556 implements search processing using specified conditions retrieving from the various information or data in the HD 511. The search processing unit 556 according to the present embodiment is used to search for and specify document data on the basis of the document data address information and attribute information stored in the history information storage unit 552.

The UI control unit 553 is configured with the external input controller 505 for controlling instruction input from the keyboard 509 and the display controller 506 for controlling display by the display module 510, which is a liquid crystal display or the like.

The external communication control unit 555 is configured with a network interface card 508 which controls the bidirectional exchange of data with the other network devices via the LAN 20.

Disposal Device

Figure 4:
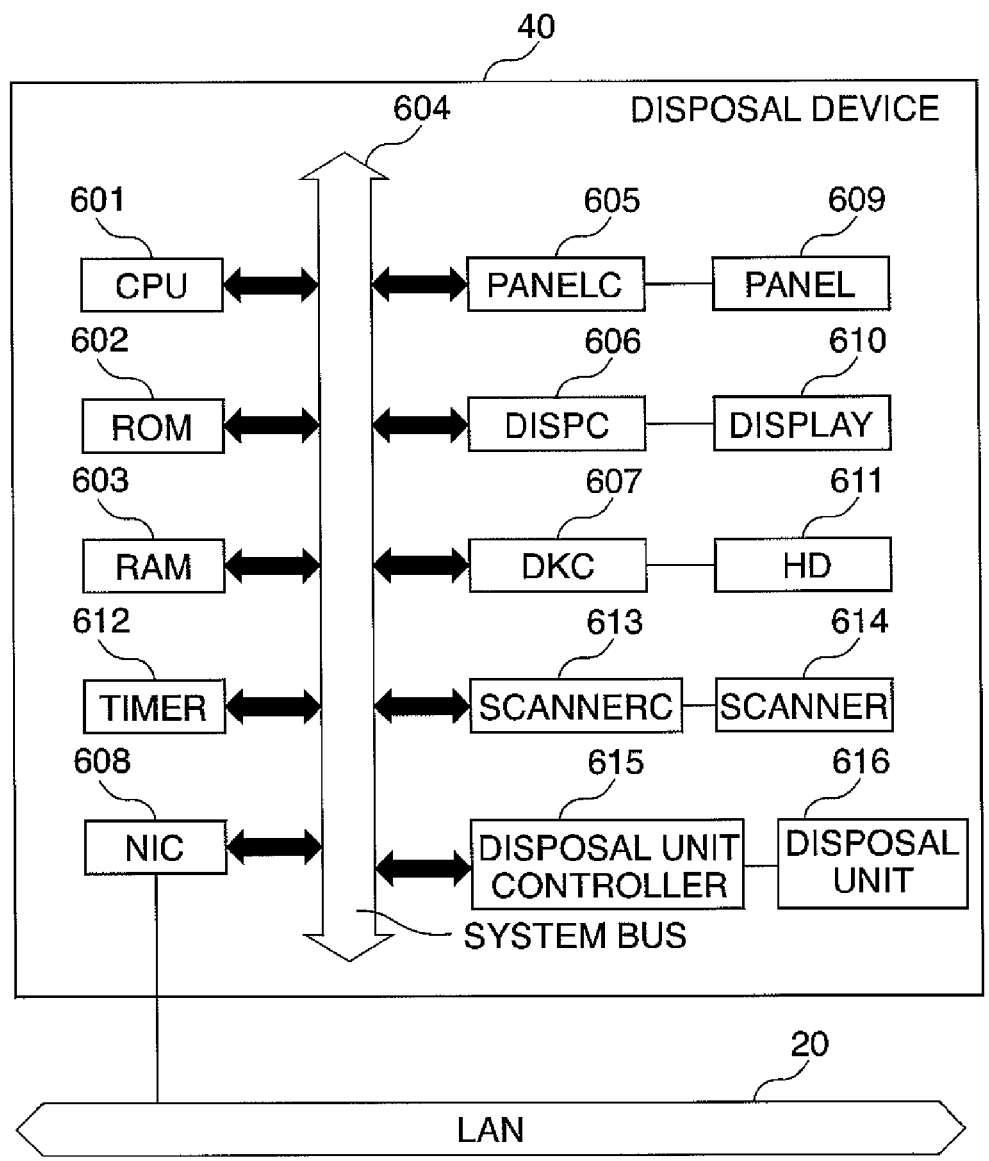
FIG. 4 is a block diagram showing an internal hardware configuration of a disposal device appearing in FIG. 1.

FIG. 4 is a block diagram showing an internal hardware configuration of the disposal device 40 appearing in FIG. 1.

As shown in FIG. 4, the disposal device 40 includes a CPU 601 for executing software stored in a ROM 602 or a large-scale storage device (hereinafter simply referred to as an HD) 611 such as a hard disk, and performs overall control of devices connecting to a system bus 604. A RAM 603 functions as a main memory, a work area, and the like for the CPU 601. A timer 612 performs count processing to keep track of a current time in the disposal device 40.

An external input controller (PANELC) 605 controls instruction input from various buttons 609 or the like provided on the disposal device 40. A display controller (DISPC) 606 controls display by a display module (DISPLAY) 610 configured with a liquid crystal display or the like. A disk controller (DKC) 607 controls processing for reading data from and writing data to the HD 611. A network interface card (NIC) 608 performs bidirectional data exchange with other network devices or the file server or the like via the LAN 20.

A scanner controller (ScannerC) 613 illuminates a manuscript image using a light source not shown in the drawing and forms an reflected manuscript image on the solid-state imaging device using the lens, in order to recognize the manuscript placed in the disposal device 40. The scanner controller 613 then controls the read processing by the scanner 614 to obtain a raster-form image read signal as image information from the solid-state imaging device. A disposal unit controller 615 controls a disposal unit 616 which, for instance, disposes of the manuscripts, printed paper, or the like by shredding so as to produce narrow strips on which the recorded information is illegible.

Figure 7:
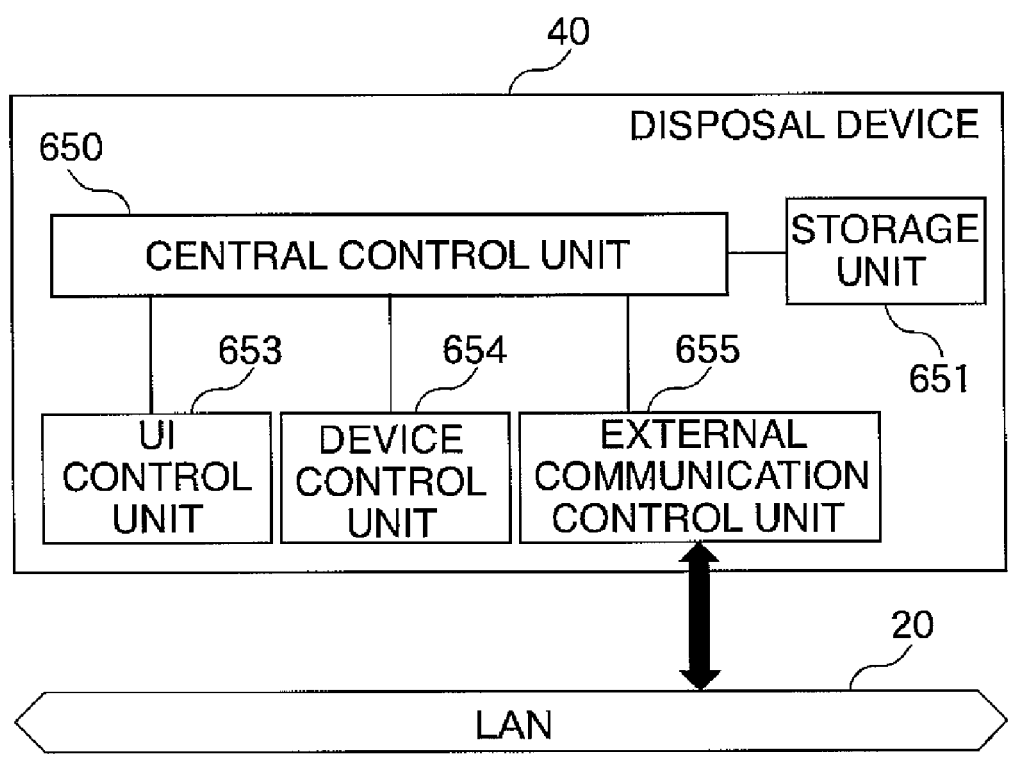
FIG. 7 is a block diagram showing a system configuration of the disposal device.

FIG. 7 is a block diagram showing a system configuration of the disposal device 40.

The disposal device appearing in FIG. 7 includes a central control unit 650 connected to a storage unit 651, a UI control unit 653, a device control unit 654, and an external communication control unit 655.

The storage unit 651 is configured with the HD 611 (see FIG. 4), and temporarily stores characteristic information for specifying documents extracted from printed paper by the scanner 614.

The UI control unit 653 is configured with the external input controller 605 for controlling instruction input from the various buttons 609 or the like provided on the disposal device 40, and the display controller 606 for controlling display by the display module 610, which is a liquid crystal display or the like.

The device control unit 654 is configured with the scanner controller 613 which controls read processing of the scanner 614 and the disposal unit controller 615 which controls processing of the disposal unit 616.

The external communication control unit 655 is configured with a network interface card 608 which controls the bidirectional exchange of data with the other network devices via the LAN 20.

Figure 16:
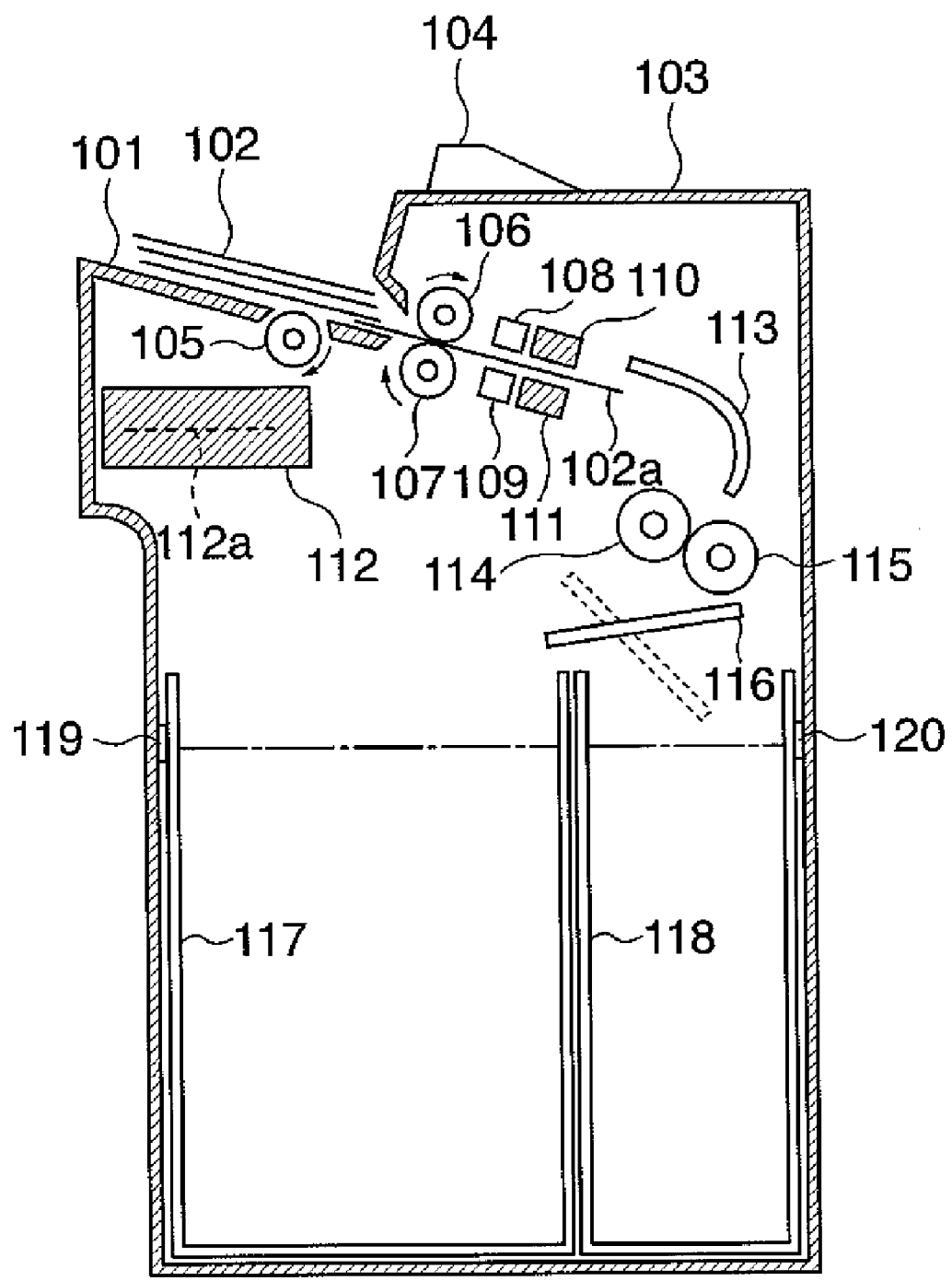
FIG. 16 is a diagram schematically showing a configuration of the disposal device.

FIG. 16 is a diagram schematically showing a configuration of the disposal device 40.

In FIG. 16, reference numeral 101 indicates a load tray for loading sheets such as printed paper for shredding. The load tray 101 is provided on an front upper surface part of the device. Sheets of paper 102 loaded in the load tray 101 are fed into the device by a feed controller 105, which is a transfer device provided under the load tray 101, in accordance with instructions inputted using an operation panel 104 provided at a top surface part 103.

The sheets of paper 102 fed into the device are separated to form single sheets by separation rollers 106 and 107 which rotate in opposing directions and work as a separation unit, and a lowermost sheet of paper 102a is supplied along a feed path. A pair of optical sensors 108 and 107, disposed opposing each other so as to sandwich the sheet of paper 102a being transferred along the feed path therebetween, detect a leading edge of the sheet of paper 102a being supplied.

After the leading edge has been detected and a predetermined delay period has passed, a pair of image reading units 110 and 111, which are disposed opposing each other so as to sandwich the sheet of paper 102a therebetween further down the feed path, simultaneously read the images on both sides of the sheet of paper 102a.

The images from both sides of the sheet of paper 102a read by the image reading units 110 and 111 are, by way of a later-described procedure, stored and accumulated on an opto-magnetic disk 112a that is a storage unit in an opto-magnetic drive unit 112.

Thereafter, when the optical sensors 108 and 109 have detected the trailing edge of the sheet of paper 102a and the predetermined delay period has passed, it is judged that the reading of the sheets of paper 102a is completed and shredding rollers 114 and 115 which work as a shredding unit begin rotating. With this arrangement, the sheet of paper 102a transferred along the bow shaped curve of a feed guide plate 113 is shredded into long thin rectangular strips.

The paper which has been shredded into long thin rectangular strips by the shredding rollers 114 and 115 is guided along a waste-paper guide plate 116 which is a separation unit, and falls and is collected in one of two transparent plastic waste-paper collection boxes 117 and 118 located in a comparatively large space at a lower front part of the device.

Waste-paper full detection sensors which make use of an optical sensor comprising a light generating unit 119 and a light receiving unit 120 are fitted to the outer sides of the waste-paper collection boxes 117 and 118. When either of the waste-paper collection boxes 117 and 118 becomes full of shredded waste paper, shredding is suspended and a full-up warning is displayed on the operation panel 104.

When the disposal device 40 disposes of paper, the paper targeted for disposal is first read by the scanner 614. Once reading has been completed, the disposal unit 616 disposes of the paper. A more detailed description follows later, but it is to be noted that the disposal device 40 is configured to be able to disallow disposal processing by the disposal unit 616 until the permission to dispose of the paper read by the scanner 614 is granted.

The disposal unit 616 of the present embodiment realizes paper disposal by shredding the paper into narrow strips. However other disposal methods such as dissolving or incineration of paper may be used.

Document Management Server

Figure 9:
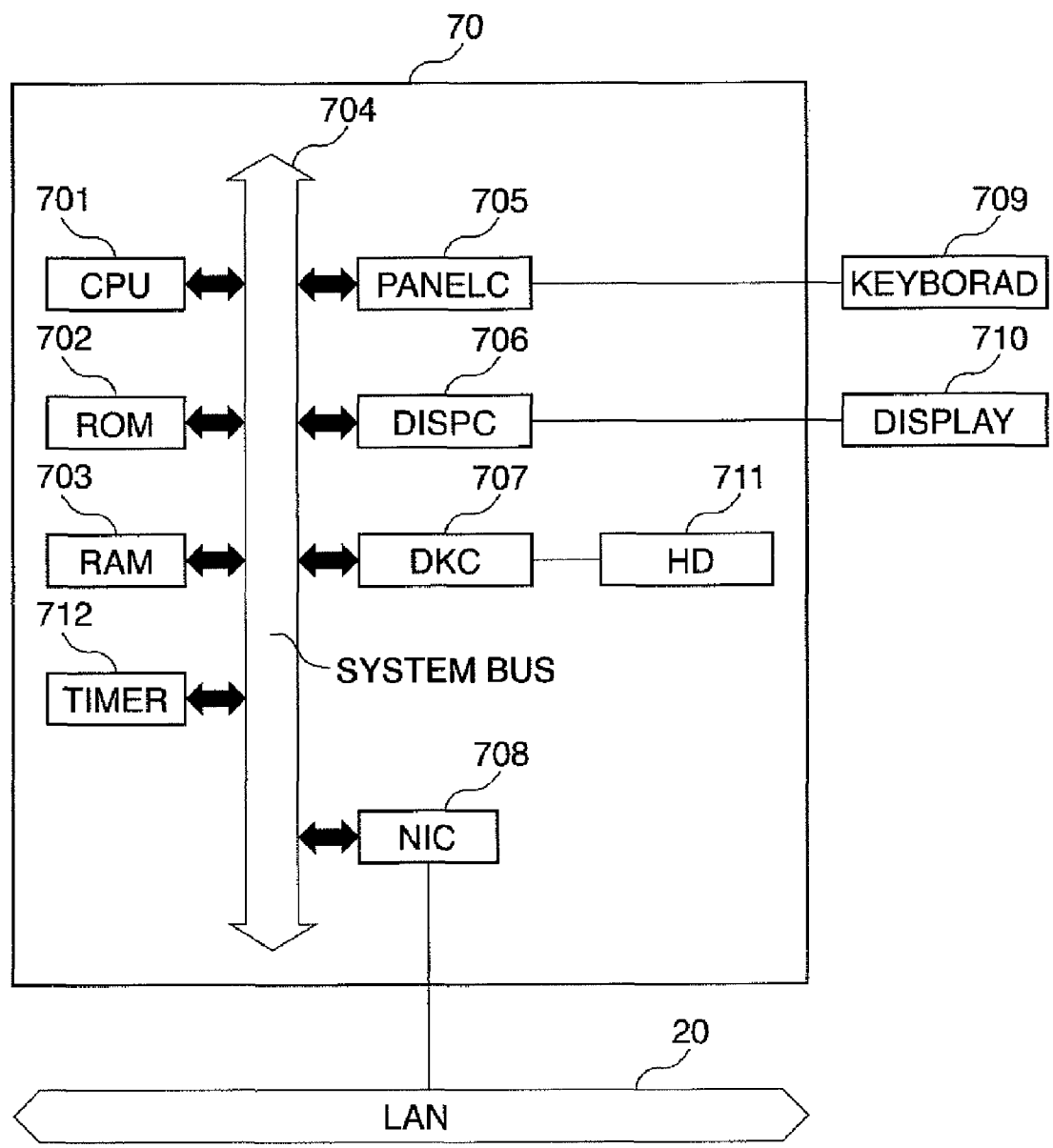
FIG. 9 is a block diagram showing an internal hardware configuration of the document management server.

FIG. 9 is a block diagram showing an internal hardware configuration of the document management server 70.

As shown in FIG. 9, the document management server 70 includes a CPU 701 for executing software stored in a ROM 702 or a large-scale storage device (hereinafter simply referred to as an HD) 711 such as a hard disk, and performs overall control of devices connecting to a system bus 704. A RAM 703 functions as a main memory, a work area, and the like for the CPU 701. A timer 712 performs count processing to keep track of a current time in the document management server 70.

An external input controller (PANELC) 705 controls instruction input from an externally connected input interface unit (hereinafter simply referred to as a keyboard) 709 which is a keyboard or the like. A display controller (DISPC) 706 controls display by an externally connected display module (DISPLAY) 710 such as a liquid crystal display.

A disk controller (DKC) 707 controls processing for reading data from and writing data to the HD 711. A network interface card (NIC) 708 performs bidirectional data exchange with other network devices or the file server or the like via the LAN 20. The document management server 70 of the above configuration can be realized using a personal computer or workstation.

Figure 8:
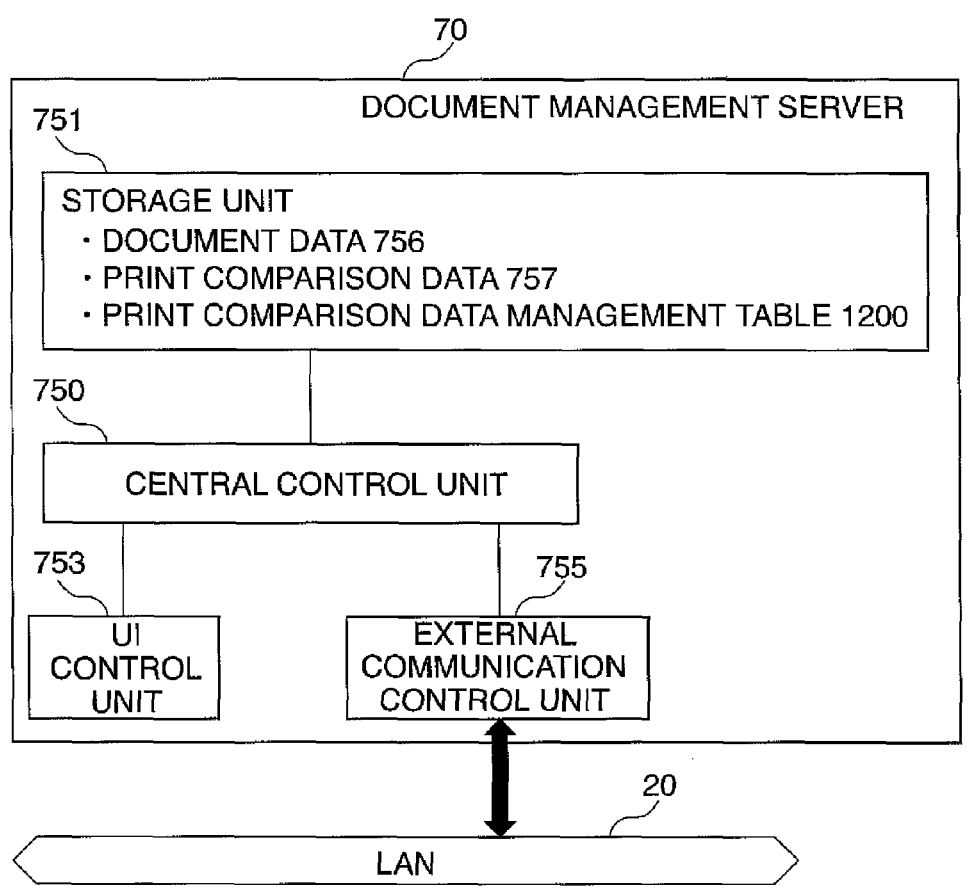
FIG. 8 is a block diagram showing a system configuration of a document management server.

FIG. 8 is a block diagram showing a system configuration of the document management server 70.

The document management server 70 appearing in FIG. 8 includes a central control unit 750 connected to a storage unit 751, a UI control unit 753, and an external communication control unit 755.

The storage unit 751 is configured with the HD 711 (see FIG. 9) and stores document data 756 and print comparison data 757. The document data 756 is transmitted from devices such as the networked copier 10 when the document data is to be stored. The print comparison data 757 is data used to confirm that appropriate printed paper or the like is the target of disposal management during disposal.

The UI control unit 753 is configured with the external input controller 705 for controlling instruction input from the keyboard 709 or the like and the display controller 706 for controlling display by the display module 710, which is a liquid crystal display or the like. The external communication control unit 755 is configured with a network interface card 708 which controls the bidirectional exchange of data with the other network devices via the LAN 20.

The following describes processing to register document data on the server, processing to print the document data, processing to delete the document data, processing to dispose of manuscripts, and processing to delete printed paper (printed matter) and print comparison data.

Processing to Register Document Data

First, the processing to store the document data on the server is described with reference to FIG. 17.

Figure 17:
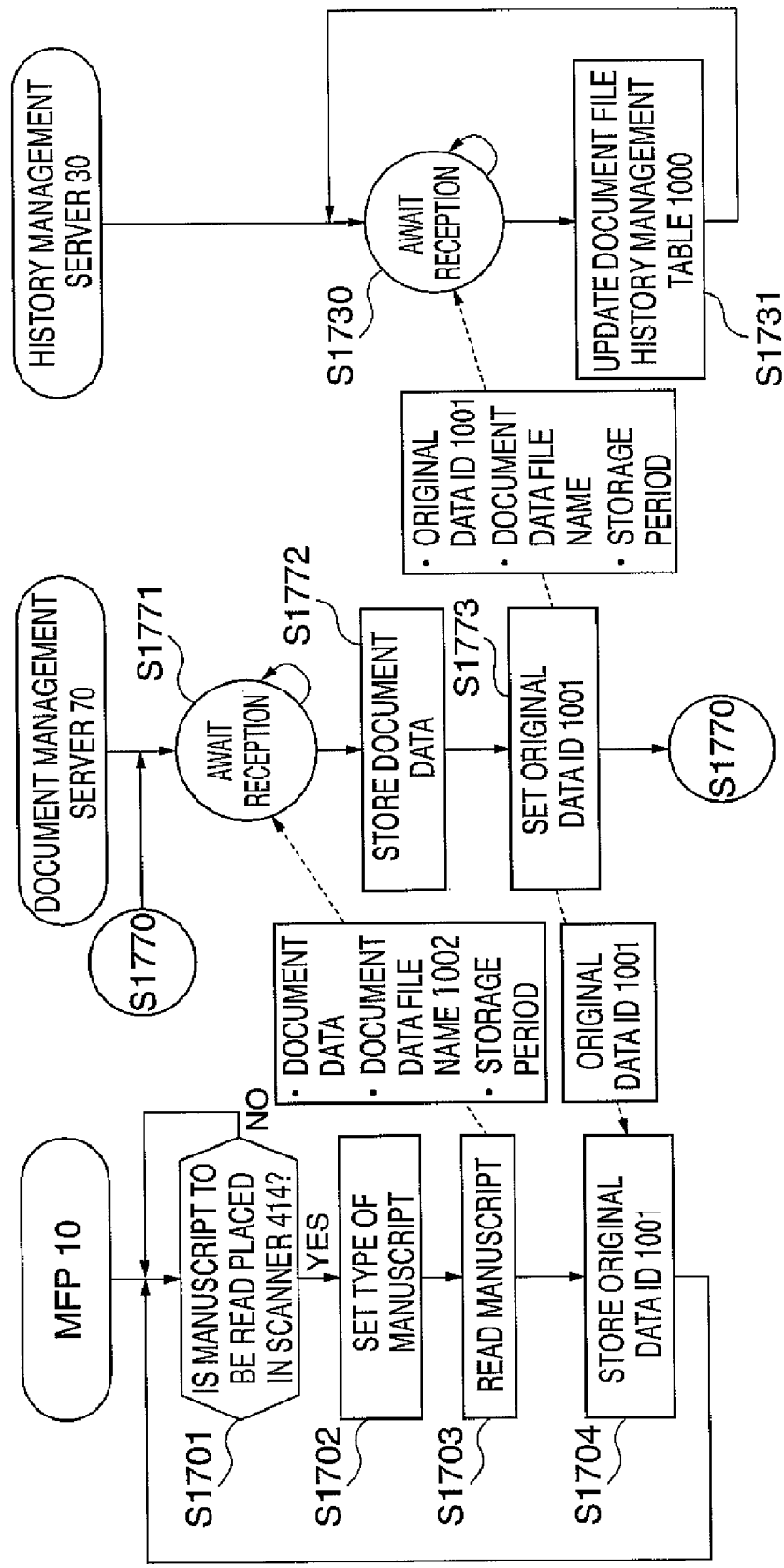
FIG. 17 is a flowchart showing the procedure of a registration process executed by the network document management system when registering document data to a document management server.

FIG. 17 is a flowchart showing the procedure of a registration process executed by the network document management system 100 when registering document data to a document management server. The processing of step S1701 to step S1704 in FIG. 17 is performed in the copier 10.

When a manuscript for reading has been placed in the scanner 414 (YES in step S1701) by the user, in step S1702, the copier 10 receives user settings that include a manuscript type ("color/monochrome", for instance), a document data file name, and a document data storage period, via user operations on the touch panel 409.

In step S1703, the copier 10 reads the manuscript using the scanner 414, and transmits the document data to the document management server 70. In step S1703 the copier 10 also transmits the user settings set in step S1702 to the document management server 70.

The processing of step S1771 to step S1773 in FIG. 17 is performed in the document management server 70.

In step S1771, the document management server 70 receives the document data and the user settings from the copier 10, and, in step S1772, stores the received document data in the storage unit 751 of the document management server 70.

In step S1773, the document management server 70 determines an original data ID 1001 to specify the document data stored in step S1772, and transmits the original data ID 1001 to the copier 10. In step S1704, the copier 10 receives the original data ID 1001 transmitted from the document management server 70, and stores the original data ID 1001 in the storage unit 451. The original data ID 1001 is an ID used to uniquely specify the document data read from the manuscript by the copier 10 and stored in the document management server 70.

In step S1773, the document management server 70 transmits the original data ID 1001, the document data file name, and the document data storage period to the history management server 30.

The processing of step 1730 and step 1731 in FIG. 17 is performed in the history management server 30.

In step S1730, the history management server 30 receives the original data ID 1001 transmitted from the document management server 70, and then proceeds to step S1731. In step S1731, the history management server 30 stores the received original data ID 1001 and the document data file name in a document file history management table (hereinafter referred to as a document history management table) 1000 (see FIG. 10), and sets a data registration date 1003. The history management server 30 further stores a storage period for the received document data as a storage period 1004.

Document History Management Table

The following describes the document history management table managed by the history management server 30.

FIG. 10 is a view of the document history management table 1000 appearing in FIG. 6. The document history management table 1000 is stored in the history information storage unit 552 (which is the HD 511) of the history management server 30, and is managed by the central control unit 550.

The document history management table 1000 has seven headings which are the original data ID 1001, a document data file name 1002, the data registration date 1003, the storage period 1004, a document data deletion date 1005, a number of remaining printed pages 1006, and a manuscript disposal date 1007. The following describes the headings.

The original data ID 1001 is an identifier used to uniquely specify the document data stored in the document management server 70.

The document data file name 1002 is a file name of the document data. In the example of FIG. 17, the document data file name 1002 is the document data file name inputted via operations on the touch panel 409 by the user in step S1702.

The data registration date 1003 is data indicating a date at which the document data was registered on the document management server 70.

The storage period 1004 indicates the storage period for the document data. In the example of FIG. 17, the storage period 1004 corresponds to the storage period inputted via operations on the touch panel 409 by the user in step S1702.

The original data ID 1001, the document data file name 1002, the data registration date 1003, and the storage period 1004 are data received from the document management server 70.

The document data deletion date 1005 is a date at which the document data stored in the document management server 70 is to be deleted from the document management server 70. The date of the document data deletion date 1005 is calculated from the data registration date 1003 and the storage period 1004.

The number of remaining printed pages 1006 indicates the number of printed pages in existence, which is the number of pages printed out from the document data and not disposed of. A way of calculating the number of remaining printed pages 1006 is described later.

The manuscript disposal date 1007 is a date at which an original manuscript, which served as the source of the document data stored in the document management server 70, underwent disposal. Input of the date for the manuscript disposal date 1007 is described later.

Print Processing for the Document Data

Figure 18:
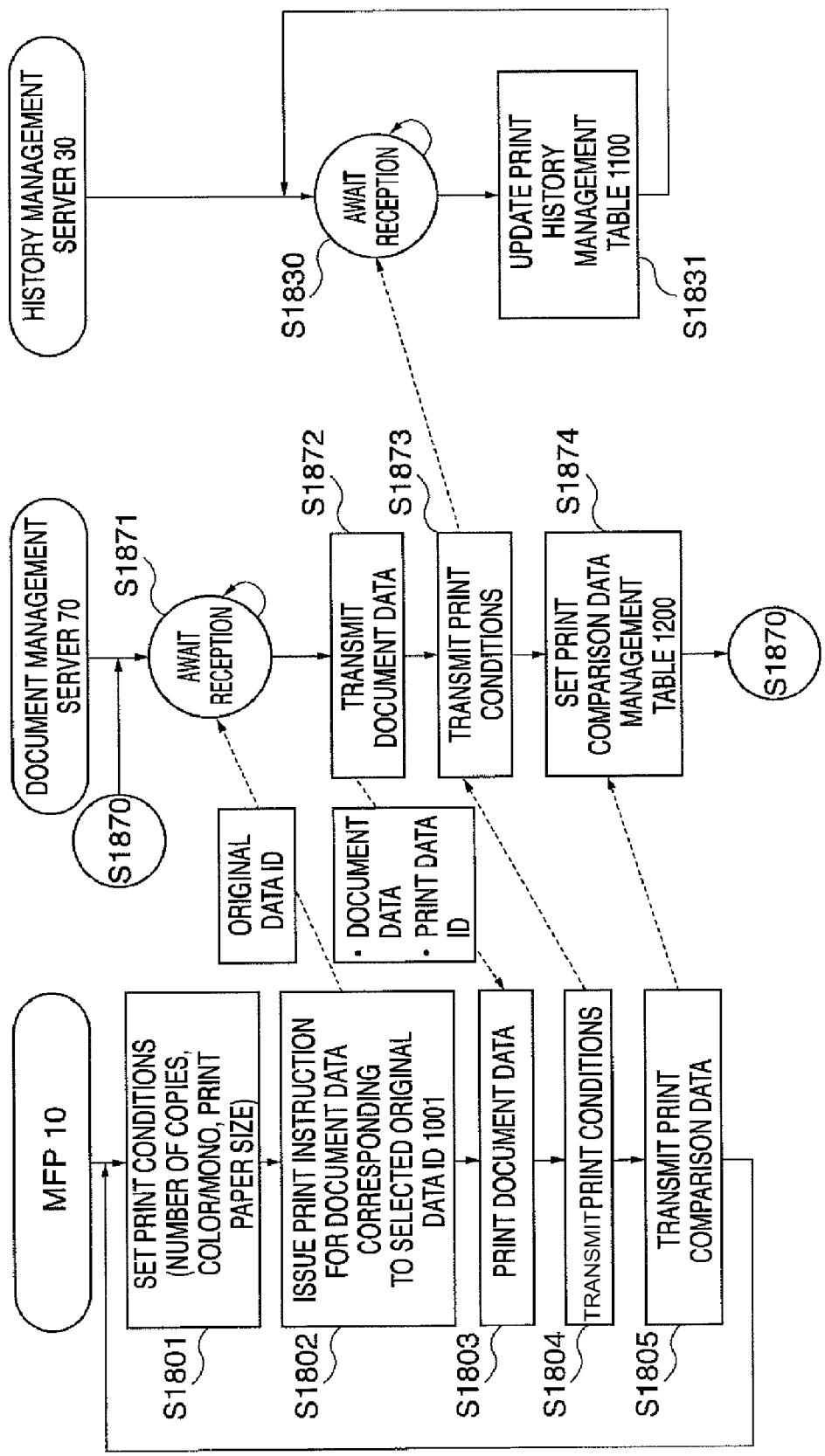
FIG. 18 is a flowchart showing the procedure of a printing process executed by the network document management system when printing the document data.

The following describes processing used when printing the document data registered on the document management server 70, with reference to FIG. 18.

FIG. 18 is a flowchart showing the procedure of a printing process executed by the network document management system 100 when printing the document data. Step S1801 to step S1805 in FIG. 18 are performed by the copier 10.

In step S1801, printer conditions (i.e. number of copies, color/monochrome, print paper size) are set based on touch panel 409 operations by the user.

In step S1802, the copier 10 displays the internally stored original data ID 1001 on the touch panel 409, and outputs a print execution instruction when the user gives a printing-start instruction for the document data corresponding to the original data ID 1001. Specifically, the copier 10 transmits the original data ID 1001 together with a print request to the document management server 70.

Figure 20:
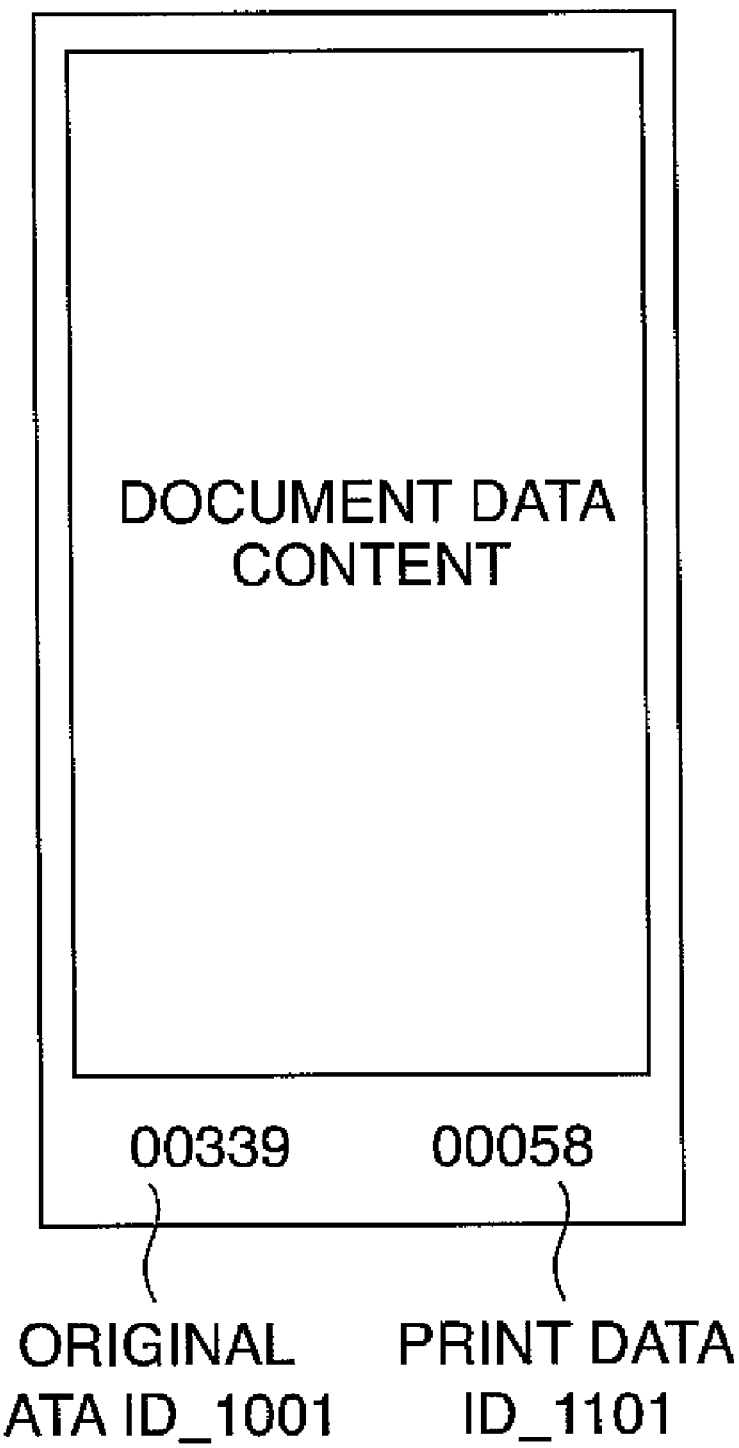
FIG. 20 is a diagram useful in explaining a format used when printing the document data and the print data ID that appears in FIG. 11.

In step S1803, the copier 10 prints the document data received from the document management server 70 in the format shown FIG. 20. In this format the original data ID 1001 and a print data ID 1101 are added to the document data content. The print data ID 1101 is described later.

In step S1804, the copier 10 transmits the print conditions set in step S1801. Note that the processing of step S1804 may be performed in step S1802.

Figure 15:
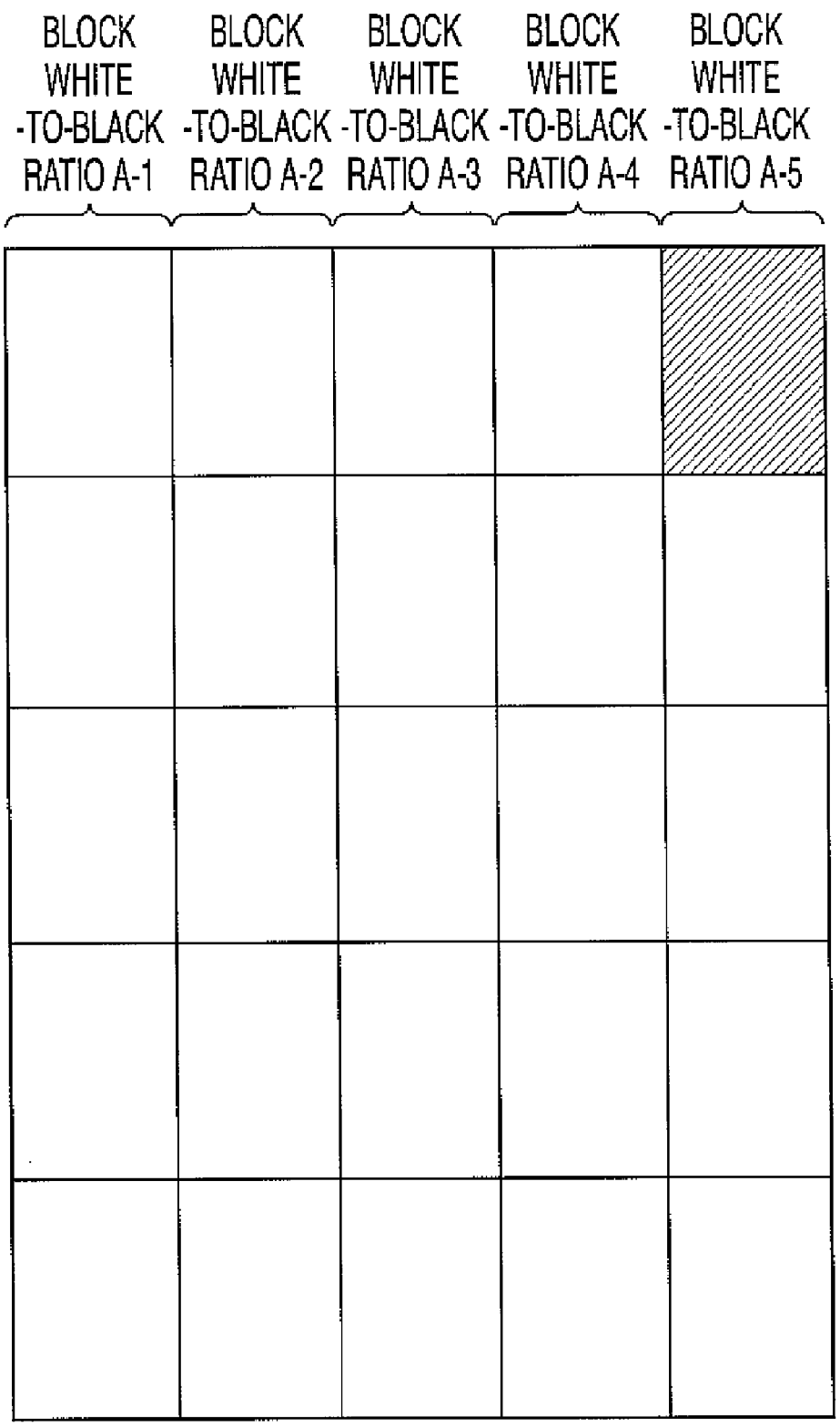
FIG. 15 is a diagram useful in explaining print comparison data appearing in FIG. 8.

In step S1805, the copier 10 calculates the print comparison data shown in FIG. 15 using the print data ID 1101, and transmits the result to the document management server 70. The print comparison data is described later.

The processing of step S1871 to step S1874 in FIG. 18 is performed in the document management server 70.

In step S1871, the document management server 70 receives the original data ID 1001 transmitted together with the print request from the copier 10, and proceeds to step S1872. In step S1872, the print document management server 70 specifies the document data stored in the storage unit 751 using the received original data ID 1001, determines the print data ID 1101, and transmits the print data ID 1101 and the document data to the copier 10. The print data ID 1101 is an identifier that uniquely specifies a print based on the print request from the copier 10, and is generated by the document management server 70.

In step S1873, the document management server 70 transmits the print conditions received from the copier 10 and the original data ID 1001 received in step S1871 to the history management server 30.

In step S1874, the document management server 70 stores the print comparison data shown in FIG. 15 and received from the copier 10 as print comparison data 757 in the storage unit 751, and updates a print comparison data management table 1200. The print comparison data 757 is described later.

The following describes the print comparison data management table managed by the document management server 70.

FIG. 12 is a view of the print comparison data management table 1200 appearing in FIG. 8. The print comparison data management table 1200 is stored in the storage unit 751 (which is the HD 711) of the document management server 70, and is managed by the central control unit 750.

The print comparison data management table 1200 includes headings for the original data ID 1001, the print data ID 1101, a print comparison data file name 1201, and a print comparison data deletion date 1202.

The original data ID 1001 is an identifier for uniquely specifying the document data stored in the document management server 70. The original data ID 1001 here is the same as the original data ID 1001 in the document history management table 1000.

The print data ID 1101 is an identifier generated by the document management server 70 for uniquely specifying a print based on the print request from the copier 10.

The a print comparison data file name 1201 is a file name generated to specify the print comparison data transmitted from the copier 10 to the document management server 70 in step S1874.

The print comparison data deletion date 1202 indicates the date at which the print comparison data was deleted in deletion processing, which is described later.

The following is a continuation of the description of the procedure shown in FIG. 18. The processing of step S1830 and step S1831 in FIG. 18 is performed in the history management server 30.

In step S1830, the history management server 30 awaits transmission of the print conditions from the document management server 70, and, on receiving the print conditions, proceeds to step S1831. In step S1831, the history management server 30 records the received print conditions in the print history management table 1100. Further, the history management server 30 adds the number of pages to be printed to the number of remaining printed pages 1006. Since it is conceivable that the document data is a multi-page document, the "number of remaining printed pages" may be managed as a "number of remaining prints".

The processing performed when printing document data registered on the document management server 70 has been described above.

Print Comparison Data

The following describes the print comparison data with reference to FIG. 15.

FIG. 15 is a diagram used in a description of the print comparison data appearing in FIG. 8.

When printing the document data, the copier 10 calculates a white-to-black ratio for each block of the document data. When the document data represents a color image, the white-to-black ratio may be calculated after first converting the color image to a monochrome image. Together, the stored white-to-black ratios for the blocks form the print comparison data shown in FIG. 15. The print comparison data is data which indicates characteristics of images of the documents. As described with reference to FIG. 12, the document management server 70 stores the print comparison data in correspondence with the document data. When later-described disposal processing is performed, the print comparison data obtained from images of the printed paper targeted for disposal are compared with the print comparison data stored in the document management server 70. This makes it possible to confirm that images of the printed paper about to undergo disposal match the document data stored by the document management server 70. The image data in FIG. 15 is divided into a plurality of small blocks and a white-to-black ratio is calculated for each block. Thus, a match/mismatch is found for each small block, and two sets of print comparison data can therefore be determined to match when at least a predetermined proportion of matching blocks are present. This is to allow a match with the document data to be confirmed even when the printed paper is partially damaged or dirtied.

Print History Management Table

The following describes the print history management table.

FIG. 11 is a view of the print history management table 1100 appearing in FIG. 6.

The print history management table 1100 is stored in the history information storage unit 552 (which is the HD 511) of the history management server 30, and is managed by the central control unit 550.

The print history management table includes seven heading which are the original data ID 1001, the print data ID 1101, a resolution 1102, a layout 1103, a color setting 1104, a print date 1105, and a disposal date 1106.

The original data ID 1001 is an identifier for uniquely specifying the document data stored in the document management server 70. The original data ID 1001 is the same as the original data ID 1001 in the document history management table 1000.

The print data ID 1101 is an identifier generated by the document management server 70 for uniquely specifying the print based on the print request from the copier 10, and is acquired from the document management server 70.

The resolution 1102, the layout 1103, the color setting 1104, and the print date 1105 are print setting values specified using the print data ID 1101. These setting values are transmitted to the document management server 70 from the MFP 10 in step S1804 (FIG. 18), and are the data obtained by the history management server 30 from the document management server 70 in step S1830. The disposal date 1106 indicates a disposal date by the disposal device 40 of the printed paper resulting from the print processing specified by the print data ID 1101.

Disposal and Deletion Processing

The above-described processing generates document data and printed paper resulting from printing output of the document data. The following describes the disposal processing for the document data, the manuscripts, and the printed paper.

Processing to Delete Document Data

Figure 13:
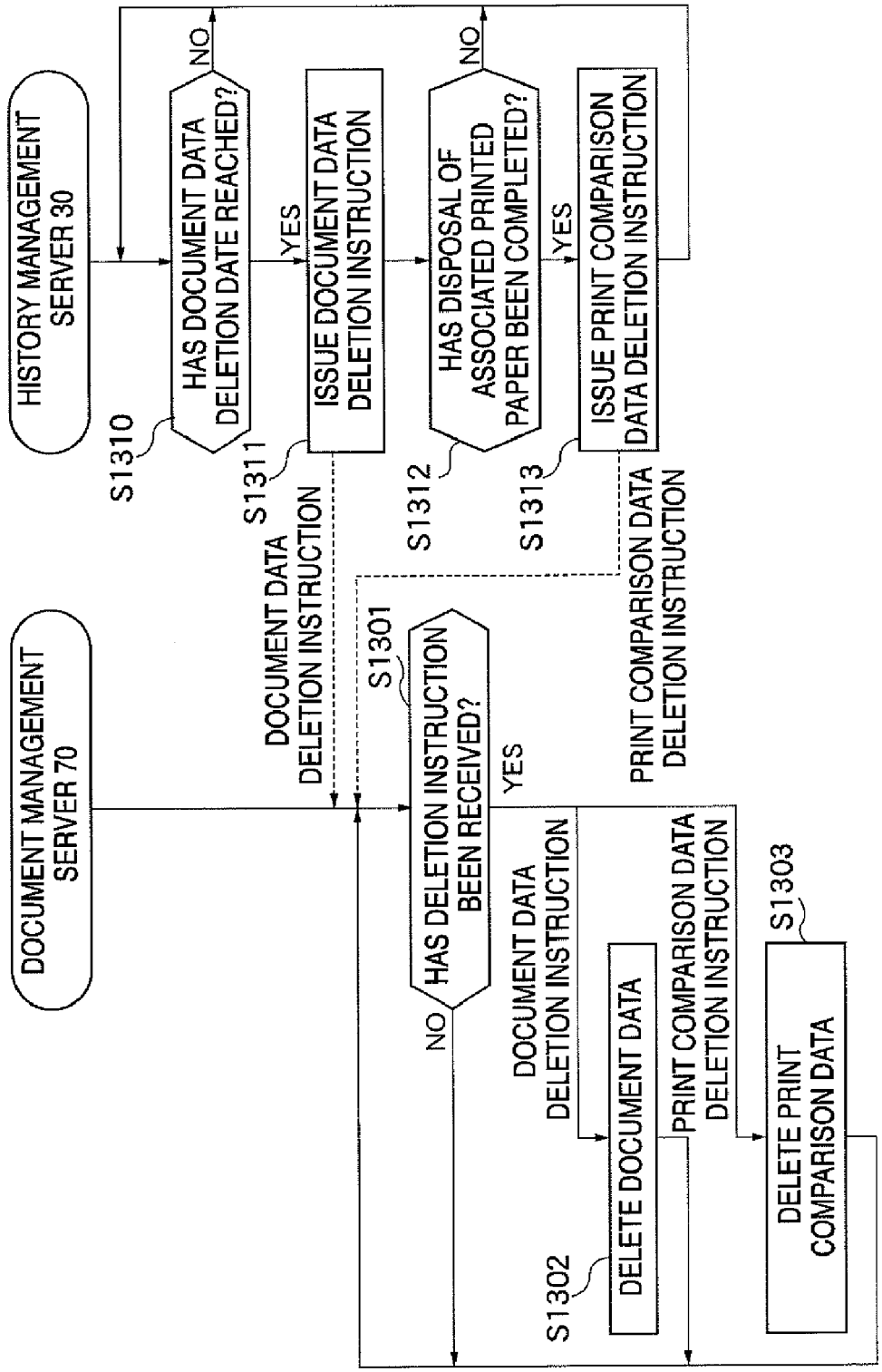
FIG. 13 is a flowchart showing the procedure of a deleting process executed by the network document management system when deleting document data.

The following describes disposal processing for the document data stored in the document management server 70, with reference to FIG. 13.

FIG. 13 is a flowchart showing the procedure of a deleting process executed by the network document management system 100 when deleting the document data. The processing of step S1310 to step S1313 in FIG. 13 is performed in the history management server 30.

The network document management system 100 deletes document data which has completed of the storage period from the document management server 70. In other words, document data which has reached the document data deletion date is deleted.

In step S1310, the central control unit 550 judges whether the document data has reached the document data deletion date by inquiring the document history management table 1000 shown in FIG. 10. This judgment is made by inquiring the document history management table 1000, and checking whether any documents have reached the date corresponding to the document data deletion date 1005. When a document which has reached the deletion date is present, the history management server 30 performs the processing of step S1311.

In step S1311, the history management server 30 transmits the original data ID 1001 of the document data that has reached the deletion date, together with a document data deletion instruction, to the document management server 70.

In step S1312, the history management server 30 inquires the number of remaining printed pages 1006 corresponding to the original data ID 1001 in the document history management table 1000, and, if the number of remaining printed pages 1006 is zero, proceeds to step S1313 on the basis that deletion of all related printed paper has been completed. If the number of remaining printed pages is non-zero, the history management server 30 does not perform the processing of step S1313 based on the fact that related printed paper remains in existence.

In step S1313, the history management server 30 transmits an instruction to delete the print comparison data together with the corresponding original data ID 1001 to the document management server 70 in order to delete the print comparison data 757 in the storage unit 751.

The processing of step S1301 to step S1303 appearing in FIG. 13 is performed in the document management server 70.

When the central control unit 750 receives the document data deletion instruction in step S1301 of FIG. 13, the processing of step S1302 is performed, and when the central control unit 750 receives the print comparison data deletion instruction, the processing of step S1303 is performed.

In step S1302, the document management server 70 inquires the document history management table 1000 shown in FIG. 10, and deletes the document data corresponding to the original data ID 1001 received from the history management server 30.

In step S1303, the document management server 70 inquires the print comparison data management table 1200 shown in FIG. 12, and deletes the print comparison data corresponding to the original data ID 1001.

By executing the processing of FIG. 13, it is possible to ensure that document data which has overrun the storage period is deleted. Moreover, by leaving, in the case that printed paper resulting from print output of the document data is still in existence, the print comparison data undeleted, it is possible to manage the disposal of the printed paper at a later date.

Disposal Processing for Manuscript

Figure 14:
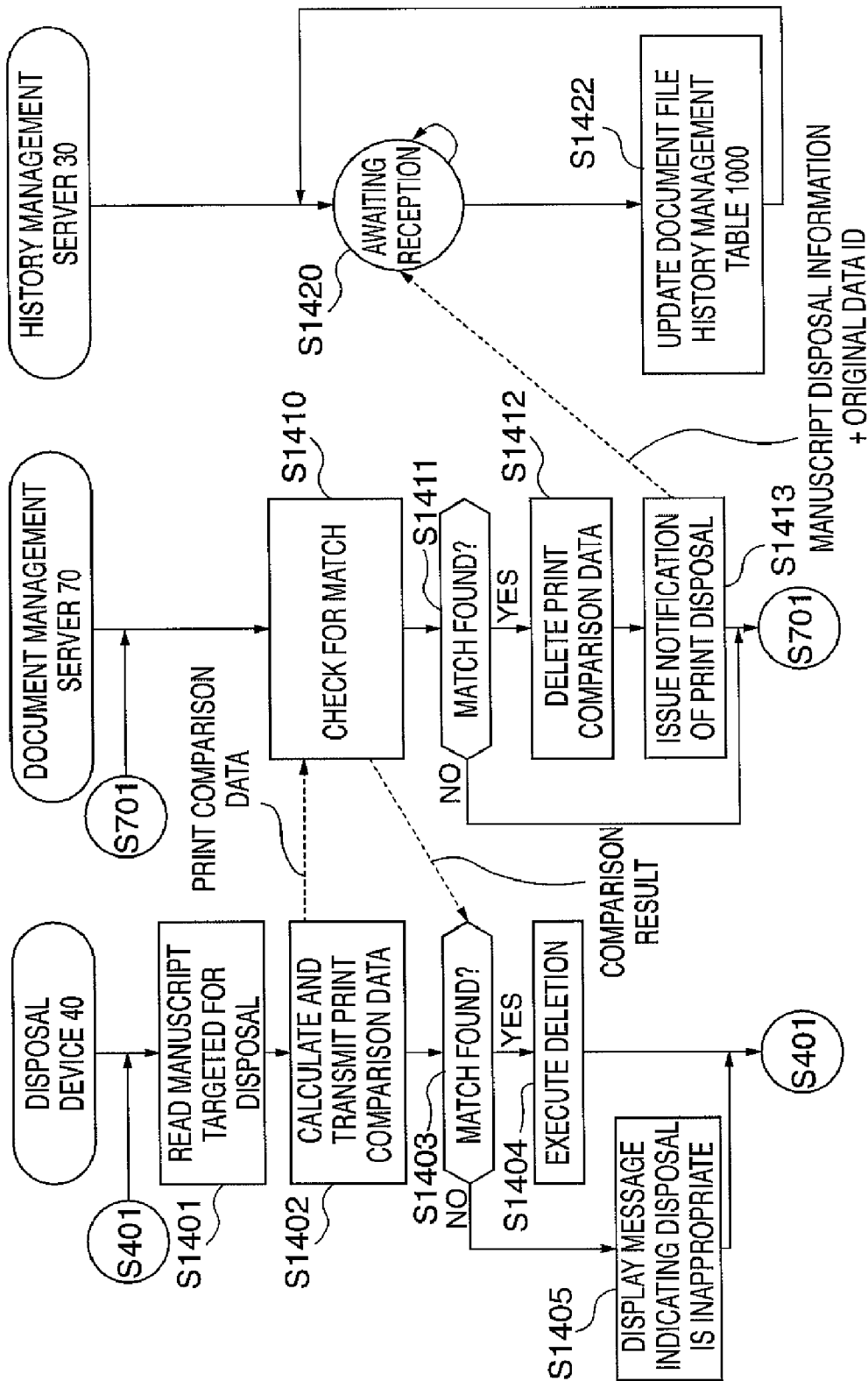
FIG. 14 is a flowchart showing the procedure of a disposing process executed by the network document management system when disposing of manuscripts.

The following describes processing to dispose of the manuscript used in the document data when executing the registration processing of FIG. 17, with reference to FIG. 14. The manuscripts are the source of the document data stored in the document management server 70. In other words, the manuscripts are the original documents.

FIG. 14 is a flowchart showing the procedure of a disposing process executed by the network document management system 100 when disposing of the manuscripts. The processing of step S1401 to step S1405 in FIG. 14 is performed in the disposal device 40, the processing of step S1410 to step S1413 is performed in the document management server 70, and the processing of step S1420 to step S1422 is performed in the history management server 30.

In step S1401, when the manuscript has been placed in the disposal device 40 and the user has given an instruction to start disposal via the buttons 609, the central control unit 650, which received the disposal instruction via the UI control unit 653, uses the device control unit 654 to execute read processing on the manuscript targeted for disposal. By this process, the disposal device 40 calculates the print comparison data, which is manuscript characteristic information from the manuscript. Note that the manuscript does not include additional image data such as the original data ID 1001 or the print data ID 1101, which are shown in FIG. 20. When unable to detect this additional information on the read paper, the disposal device 40 is able to judge that the read paper is the original manuscript rather than a copy printed from the document data stored in the document management server 70.

In step S1402, the central control unit 650 of the disposal device 40 transmits the print comparison data of the manuscript and a disposal request to the document management server 70 via the external communication control unit 655.

In step S1410, meanwhile, the document management server 70 receives the print comparison data of the manuscript and the disposal request from the disposal device 40 via the external communication control unit 755 of the document management server 70. The central control unit 750 of the document management server 70 compares the received print comparison data with the print comparison data stored together with the document data, and specifies matching document data.

The central control unit 750 then judges whether document data having print comparison data that matches the print comparison data transmitted from the disposal device 40 is present. After transmitting a comparison result to the disposal device 40 via the external communication control unit 755, the central control unit 750 of the document management server 70 proceeds to the processing of step S1411.

When, in step S1403, the comparison result transmitted via the external communication control unit 655 of the disposal device 40 indicates a match, the central control unit 650 disposes of the manuscript in step S1404 by way of the device control unit 654, and terminates the processing. When, on the other hand, the comparison result indicates no match, the central control unit 650 displays, in step S1405, a message showing that disposal is unsuitable on the display module 610, which is a liquid crystal display or the like, by way of the UI control unit 653.

In step S1411, when the comparison result of step S1410 indicates a match, the central control unit 750 of the document management server 70 deletes, in step S1412, the print comparison data for which the comparison result indicated a match, and proceeds to step S1413. When the comparison result indicates no match, the central control unit 750 awaits transmission of data from the disposal device 40.

In step S1413, the document management server 70 transmits the original data ID 1001 corresponding to the print comparison data deleted in step S1412, and information indicating that the manuscript has been disposed of to the history management server 30.

On receiving the original data ID 1001 and the information indicating that the manuscript has been disposed of in step S1420, the history management server 30 proceeds to step S1422. In step S1422, the central control unit 550 of the history management server 30 inputs the current date as the manuscript disposal date 1007 of the original data ID 1001 in the document history management table 1000 shown in FIG. 10. The above has described the processing for disposing of the manuscript. By executing the processing of FIG. 14, it is possible to manage disposal of the manuscript in association with and separately to the disposal of the corresponding document data and printed paper resulting from printing out the document data.

Disposal Processing for Printed Paper

Figure 19:
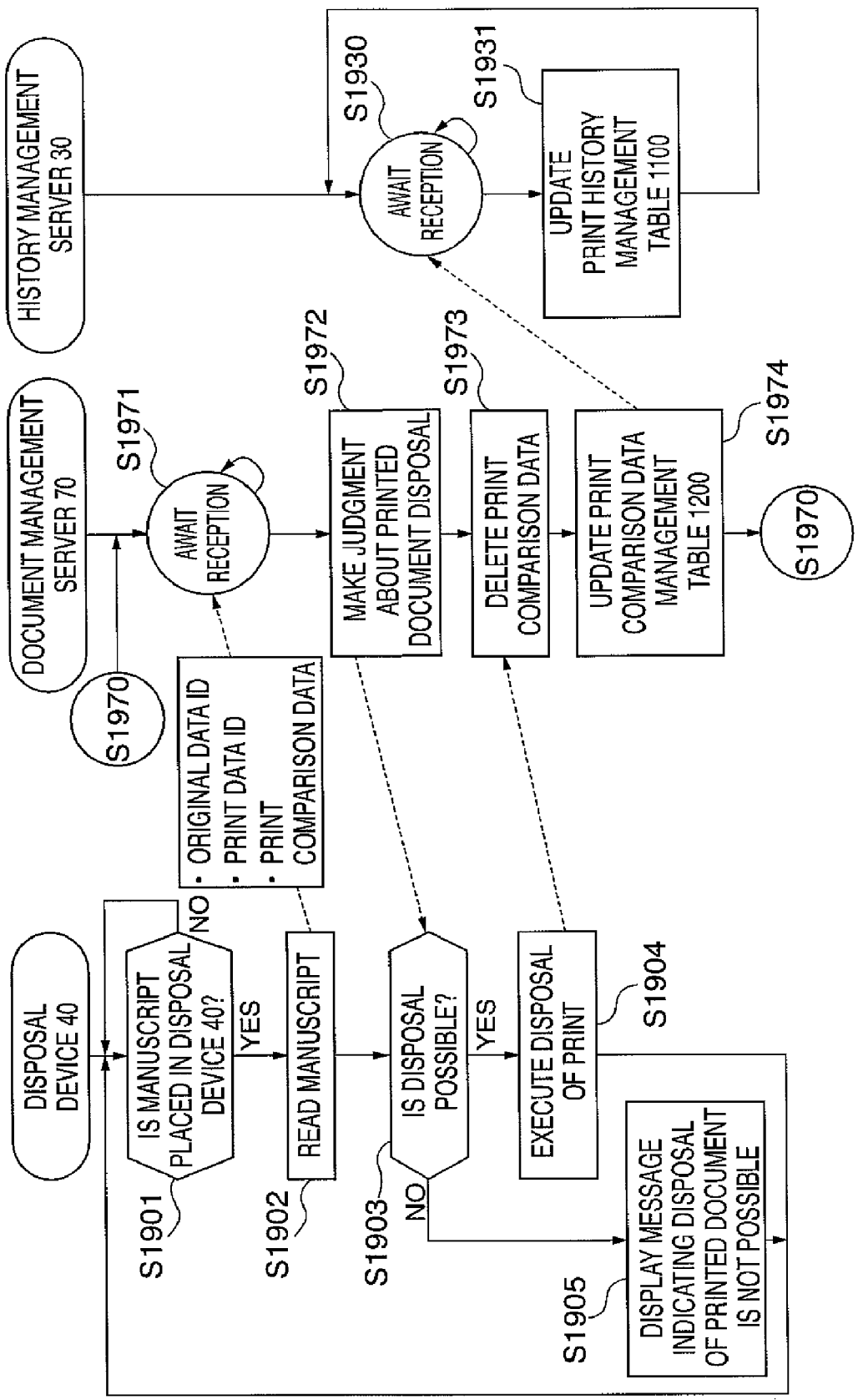
FIG. 19 is a flowchart showing the procedure of a disposal process executed by the network document management system when disposing of printed paper.

The following describes the disposal processing of the printed paper, with reference to FIG. 19. FIG. 14 illustrated the disposal processing for the manuscript. FIG. 19, on the other hand, illustrates disposal processing for the plurality of printed paper resulting from print output of the document data, rather than for the original manuscript.

FIG. 19 is a flowchart showing the procedure of a disposal process executed by the network document management system 100 when disposing of the printed paper. The processing of step S1901 to step S1905 in FIG. 19 is performed in the disposal device 40.

When a printed document targeted for disposal is placed in the load tray 101 of the disposal device 40 by the user (YES in step S1901), the disposal device 40 proceeds to the processing of step S1902.

In step S1902, the disposal device 40 reads data from the printed document using the image reading units 110 and 111 of the disposal device 40, extracts the print comparison data shown in FIG. 15 and the original data ID 1001 and print data ID 1101 shown in FIG. 20, and transmits the extracted data to the document management server 70.

In step S1903, the disposal device 40 receives a judgment result about disposal of the printed document from the document management server 70, and proceeds to step S1904 if disposal is possible, and to step S1905 if disposal is not possible.

In step S1904, the disposal device 40 executes disposal processing on the printed document using the shredding rollers 114 and 115, and transmits the disposal date to the document management server 70.

In step S1905, the disposal device 40 causes the display module 610 to display a message indicating that disposal of the printed document is not possible.

The processing of step S1971 to step S1974 in FIG. 19 is performed in the document management server 70.

In step S1971, the document management server 70 receives the original data ID 1001 and the like transmitted from the disposal device 40, and proceeds to step S1972. In step S1972, the document management server 70 inquires the print comparison data management table 1200 and judges whether the printed document in the disposal device 40 has already been registered, based on the received original data ID 1001, the print data ID 1101 and the print comparison data. The document management server 70 then transmits the judgment result to the disposal device 40.

In step 1973, the document management server 70 receives the disposal date of the printed document from the disposal device 40, and deletes the corresponding print comparison data stored in the print comparison data 757 in the storage unit 751.

In step S1974, the document management server 70 sets the print comparison data deletion date 1202 corresponding to the print data ID in the print comparison data management table 1200, and transmits the print data ID 1101 together with the disposal date received from the disposal device 40 to the history management server 30.

The processing of step S1930 and step S1931 in FIG. 19 is performed in the history management server 30.

In step S1930, the history management server 30 receives the print data ID 1101 and the disposal date from the document management server 70, and proceeds to step S1931. In step S1931, the history management server 30 updates the print history management table 1100 by inputting the received disposal date as the disposal date 1106 corresponding to the received print data ID. The history management server 30 then inquires the print history management table 1100 and specifies the original data ID 1001 corresponding to the print data ID. The history management server 30 then reduces by one, the number of remaining printed pages corresponding to the original data ID 1001. This completes the disposal processing for printed paper.

By executing the processing of FIG. 19, it is possible to have the history management server 30 manage disposal of the printed paper resulting from print output of the document data.

As described above, the present embodiment allows disposal management of both document data and printed documents resulting from print output of the document data to be reliably implemented.

Also, when, at deletion of document data from the document management server 70, printed documents resulting from print output of the document data have not been disposed of, management data to allow disposal of the remaining printed paper to be confirmed is left on the document management server 70. Hence, even after the document data has reached the disposal limit and been deleted, it remains possible to implement checks on the disposal of the document data and the printed paper.

Note, however, that the present invention is not limited to the example of the above described embodiment, and suitable modifications can be made without departing from the spirit of the present invention.

For instance, although in the above-described embodiment, two different servers comprising of the document management server 70 and the history management server 30 are used, a single server combining the functions of the two servers may be used.

Also, although in above-described embodiment the disposal device 40 is provided as a separate device, a shredder-including copier which is a copier including the disposal device 40 may be used.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read out from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic optical disk, a CD-ROM, a CD-R, a CD-RW, a DVD-ROM, a DVD-RAM, a DVD-RW, a DVD+RW, a magnetic tape, a non-volatile memory card, and a ROM. Alternatively, the program may be downloaded via a network.

Further, it is to be understood that the functions of the above-described embodiment may be accomplished not only by executing a program code read out by a computer, but also by causing an OS (operating system) or the like which operates on the computer to perform a part or all of the actual operations based on instructions of the program code.

Further, it is to be understood that the functions of the above-described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2006-344756 filed Dec. 21, 2006, which is hereby incorporated by reference herein in its entirety.

What is claimed is:

1. A document management system including a document storage device that stores document data and management information of the document data, and a printing device that prints the document data stored in the document storage device onto at least one document-data printed sheet, the document management system comprising:
  a management unit adapted to manage a print history of images based on the document data printed by the printing device and to manage information indicating whether or not a non-disposed sheet remains, the non-disposed sheet being a sheet from among the document data-printed sheet(s) that has not been disposed, and the information indicating whether or not the non-disposed sheet remains being based on the number of document data-printed sheet(s) and the number of at least one sheet which has been disposed of among the document data-printed sheet(s);
  a receiving unit adapted to receive a deletion instruction for at least one set of document data stored in the document storage device;
  a first deletion unit adapted to delete the document data targeted for deletion from the document storage device based on the deletion instruction; and
  a second deletion unit adapted to delete the management information of the document data targeted for deletion from the document storage device in accordance with the information managed by said management unit indicating that the non-disposed sheet does not remain,
  wherein the management information is used for managing the information managed by said management unit, and
  wherein each of said management unit, receiving unit, first deletion unit, and second deletion unit are implemented at least in part by a computer, and wherein the at least one sheet which has been disposed of has been disposed of by shredding.

2. The document management system according to claim 1, wherein said management unit is adapted to update the number of the document data-printed sheet(s) based on the print history.

3. The document management system according to claim 1, further comprising:
  a disposal device adapted to dispose of the document data-printed sheet(s), wherein said management unit is adapted to reduce a count of the document data-printed paper sheet(s), according to the number of document data-printed sheet(s) disposed of by the disposal device.

4. The document management system according to claim 3, further comprising:
  a generation unit adapted to generate, when the document data are to be printed onto a sheet using the printing device, a print identifier specific to the printing;
  an adding unit adapted to add the generated print identifier to the management information so as to be in correspondence with the document data targeted for printing; and
  a printing unit adapted to print the document data based on the print identifier added to the management information onto a sheet.

5. The document management system according to claim 4, wherein the disposal device includes:
  a reading unit adapted to read images on a sheet targeted for disposal, and to generate image data;
  an extracting unit adapted to extract the print identifier from the image data generated by said reading unit; and
  a transmitting unit adapted to transmit the printed identifier extracted by said extracting unit to the document storage device,
  wherein the document storage device includes:
  a permission instruction transmission unit adapted to, when the extracted print identifier matches the print identifier added to the print information by said adding unit, transmit to the disposal device an instruction to permit disposal of the sheet targeted for disposal, and
  wherein the disposal device further includes:
  a control unit adapted to perform control so that the disposal device disposes of the sheet targeted for disposal when the instruction to permit disposal of the sheet is received from said permission instruction transmission unit and avoids disposing of the sheet targeted for disposal when the instruction to permit disposal is not received from said permission instruction transmission unit.

6. The document management system according to claim 1, further comprising:
  a deletion instruction transmission unit adapted to manage a storage period for the document data stored in the document storage device, and to transmit to said receiving unit the deletion instruction of the document data for which the storage period has been completed.

7. The document management system according to claim 1, further comprising
  a manuscript reading unit adapted to generate the document data by reading a manuscript image and storing the manuscript image in the document storage device; and
  a characteristic value generation unit adapted to generate a document data characteristic value from the document data generated by said manuscript reading unit,
  wherein the management information includes the document data characteristic value generated by said characteristic value generation unit.

8. A document management method for a document management system that includes a document storage device that stores document data and management information of the document data, and a printing device that prints the document data stored in the document storage device onto at least one document-data printed sheet, the document management method comprising:
  a management step of managing a print history of images printed by the printing device based on the document data and managing information indicating whether or not a non-disposed sheet remains, the non-disposed sheet being a sheet from among the document data-printed sheet(s) that has not been disposed, and the information indicating whether or not the non-disposed sheet remains being based on the number of document data-printed sheet(s) and the number of at least one sheet which has been disposed of among the document data-printed sheet(s);

a receiving step of receiving a deletion instruction for at least one set of document data stored in the document storage device;

a first deletion step of deleting, based on the deletion instruction, document data targeted for deletion in the document storage device; and a second deletion step of deleting the management information of the document data targeted for deletion from the document storage device in accordance with the information managed in said management step indicating that the non-disposed sheet does not remain, wherein the management information is used for managing the information managed in said management step, and wherein each of said management step, receiving step, first deletion step, and second deletion step are implemented at least in part by a computer, and wherein the at least one sheet which has been disposed of has been disposed of by shredding.

9. A document management apparatus connecting to an external printing device, comprising:

a document storage unit adapted to store document data and management information of the document data;

a management unit adapted to manage a print history of images based on the document data printed by the external printing device onto at least one document-data printed sheet, and to manage information indicating whether or not a non-disposed sheet remains, the non-disposed sheet being a sheet from among the document data-printed sheet(s) that has not been disposed, and the information indicating whether or not the non-disposed sheet remains being based on the number of document data-printed sheet(s) and the number of at least one sheet which has been disposed of among the document data-printed sheet(s);

a receiving unit adapted to receive a deletion instruction for at least one set of document data stored in said document storage unit;

a first deletion unit adapted to delete the document data targeted for deletion from said document storage unit based on the deletion instruction; and a second deletion unit adapted to delete the management information of the document data targeted for deletion from said document storage unit in accordance with the information managed by said management unit indicating that the non-disposed sheet does not remain, wherein the management information is used for managing the information managed by said management unit, and wherein each of said management unit, receiving unit, first deletion unit, and second deletion unit are implemented at least in part by a computer, and wherein the at least one sheet which has been disposed of has been disposed of by shredding.

10. A document management method using a document management device that connects to an external printing device and includes a document storage unit adapted to store document data and management information of the document data, the document management method comprising:

a management step of managing a print history of images based on the document data printed by the external printing device onto at least one document-data printed sheet, and managing information indicating whether or not a non-disposed sheet remains, the non-disposed sheet being a sheet from among the document data-printed sheet(s) that has not been disposed, and the information indicating whether or not the non-disposed sheet remains being based on the number of document data-printed sheet(s) and the number of at least one sheet which has been disposed of among the document data-printed sheet(s);

a receiving step of receiving a deletion instruction for at least one set of document data stored in the document storage unit;

a first deletion step of deleting the document data targeted for deletion from the document storage unit based on the deletion instruction; and a second deletion step of deleting the management information of the document data targeted for deletion from the document storage unit in accordance with the information managed in said management step indicating that the non-disposed sheet does not remain, wherein the management information is used for managing the information managed in said management step, and wherein each of said management step, receiving step, first deletion step, and second deletion step are implemented at least in part by a computer, and wherein the at least one sheet which has been disposed of has been disposed of by shredding.

11. A non-transitory computer-readable storage medium storing a program for causing a document management device, which connects to an external printing device and includes a document storage unit for storing document data and management information of the document data, to execute a document management method, the document management method comprising:

a management step of managing a print history of images based on the document data printed by the external printing device onto at least one document-data printed sheet, and managing information indicating whether or not a non-disposed sheet remains, the non-disposed sheet being a sheet from among the document data-printed sheet(s) that has not been disposed, and the information indicating whether or not the non-disposed sheet remains being based on the number of document data-printed sheet(s) and the number of at least one sheet which has been disposed of among the document data-printed sheet(s);

a receiving step of receiving a deletion instruction for at least one set of document data stored in the document storage unit;

a first deletion step of deleting the document data targeted for deletion from the document storage unit based on the deletion instruction; and a second deletion step of deleting the management information of the document data targeted for deletion from the document storage unit in accordance with the information managed in said management step indicating that the non-disposed sheet does not remain, wherein the management information is used for managing the information managed in said management step, and wherein the at least one sheet which has been disposed of has been disposed of by shredding.

* * * * *